(12) United States Patent
Taki et al.

(10) Patent No.: US 11,694,451 B2
(45) Date of Patent: Jul. 4, 2023

(54) READING SYSTEM, READING METHOD, STORAGE MEDIUM, AND MOVING BODY

(71) Applicants: KABUSHIKI KAISHA TOSHIBA, Minato-ku (JP); TOSHIBA DIGITAL SOLUTIONS CORPORATION, Kawasaki (JP)

(72) Inventors: Toshikazu Taki, Yokohama (JP); Tsubasa Kusaka, Yokohama (JP)

(73) Assignees: KABUSHIKI KAISHA TOSHIBA, Minato-ku (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 451 days.

(21) Appl. No.: 16/879,887

(22) Filed: May 21, 2020

(65) Prior Publication Data

US 2020/0380296 A1    Dec. 3, 2020

(30) Foreign Application Priority Data

May 27, 2019   (JP) .................................. 2019-098707

(51) Int. Cl.
*G06K 9/00*   (2022.01)
*G06V 20/62*  (2022.01)
(Continued)

(52) U.S. Cl.
CPC .............. *G06V 20/62* (2022.01); *G06F 18/22* (2023.01); *G06V 30/168* (2022.01); *G06V 30/10* (2022.01); *G06V 2201/02* (2022.01)

(58) Field of Classification Search
None
See application file for complete search history.

(56) References Cited

U.S. PATENT DOCUMENTS 9,646,218 B2 *  5/2017  Takahashi ............ G06V 30/224
2002/0021837 A1   2/2002  Suzuki
(Continued)

FOREIGN PATENT DOCUMENTS

JP   61-163475 A   7/1986
JP   02-044487 A   2/1990
(Continued)

OTHER PUBLICATIONS

Kulkarni et al., "Optical numeral recognition algorithm for seven segment display" (Year: 2016).*
(Continued)

*Primary Examiner* — Soo Jin Park
(74) *Attorney, Agent, or Firm* — Oblon, McClelland, Maier & Neustadt, L.L.P.

(57) ABSTRACT

According to an embodiment, a reading system includes a reader and a calculator. The reader reads, from a character image, a character that is displayed by a segment display. The calculator performs one of first, second, third, or fourth processing. In the first processing, the calculator calculates a first score based on a state of pixels of the character. In the second processing, the calculator calculates a second score based on a match ratio between the pixels and the extracted pixels. In the third processing, the calculator calculates a third score based on a ratio of a length of the character image in first and second direction. In the fourth processing, the calculator calculates a fourth score based on a comparison result between the detected result and preset patterns. The calculator calculates a certainty of the reading by using one of the first, second, third, or fourth score.

20 Claims, 18 Drawing Sheets

(51) Int. Cl.
*G06F 18/22* (2023.01)
*G06V 30/168* (2022.01)
*G06V 30/10* (2022.01)

(56) References Cited

U.S. PATENT DOCUMENTS

| | | | |
|---|---|---|---|
| 2016/0086031 A1* | 3/2016 | Shigeno | G06V 20/00 |
| | | | 382/103 |
| 2016/0275378 A1 | 9/2016 | Hayashi | |
| 2016/0371557 A1 | 12/2016 | Takahashi | |

FOREIGN PATENT DOCUMENTS

| | | |
|---|---|---|
| JP | 10-074240 A | 3/1998 |
| JP | 11-316794 A | 11/1999 |
| JP | 2000-339472 A | 12/2000 |
| JP | 2001-291054 A | 10/2001 |
| JP | 2008-243103 A | 10/2008 |
| JP | 2016-177655 A | 10/2016 |
| JP | 2017-010170 A | 1/2017 |
| JP | 2019-145182 A | 8/2019 |
| JP | 2020-86615 A | 6/2020 |
| WO | WO 2018/123229 A1 | 7/2018 |

OTHER PUBLICATIONS

Bonačić et al., "Optical character recognition of seven-segment display digits using neural networks" (Year: 2015).*

* cited by examiner

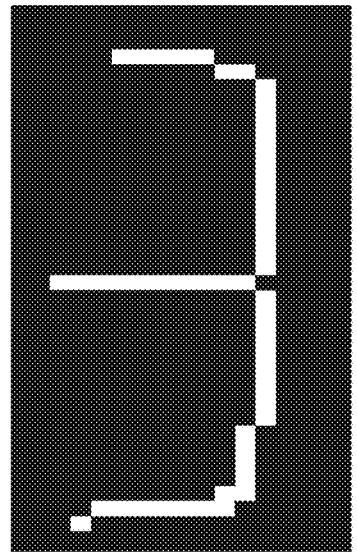
FIG. 4A  FIG. 4B
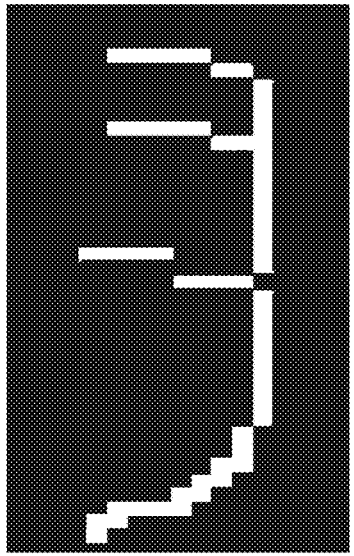
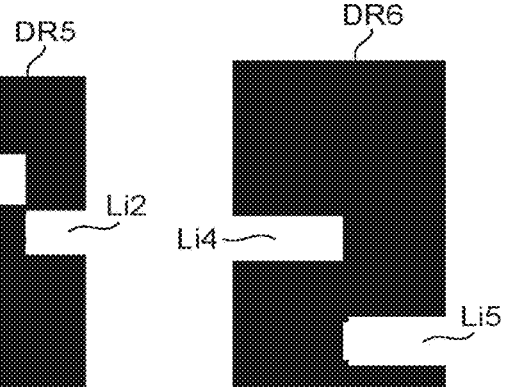
FIG. 4C  FIG. 4D  FIG. 4E

FIG. 6A
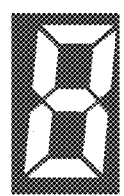
FIG. 6B
FIG. 6C
FIG. 6D
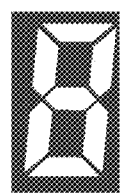
FIG. 6E
FIG. 6F
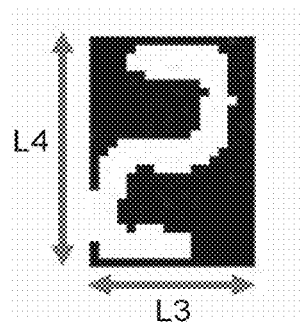
FIG. 7A
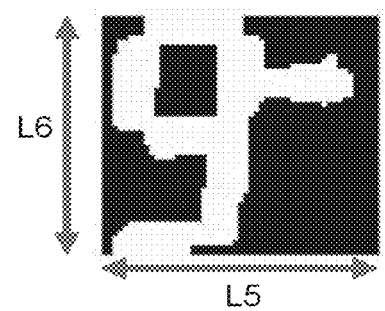
FIG. 7B
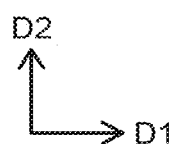

| DETERMINATION RESULTS | NUMERAL |
|---|---|
| 1111101 | 0 |
| 0000111 | 1 |
| 0110111 | 2 |
| 0101111 | 3 |
| 1101010 | 4 |
| 1001111 | 5 |
| 1011111 | 6 |
| 0101100 | 7 |
| 1111111 | 8 |
| 1101111 | 9 |

FIG. 9

READING SYSTEM, READING METHOD, STORAGE MEDIUM, AND MOVING BODY

CROSS-REFERENCE TO RELATED APPLICATIONS

This application is based upon and claims the benefit of priority from Japanese Patent Application No. 2019-098707, filed on May 27, 2019; the entire contents of which are incorporated herein by reference.

FIELD

Embodiments described herein relate generally to a reading system, a reading method, a storage medium, and a moving body.

BACKGROUND

There is a system that reads a character (e.g., a numeral) displayed in a segment display. It is desirable to increase the reliability of such a reading system.

BRIEF DESCRIPTION OF THE DRAWINGS

FIG. 3A and FIG. 3B, FIG. 4A to FIG. 4E, FIG. 5A to FIG. 5C, FIG. 6A to FIG. 6F, FIG. 7A and FIG. 7B, and FIG. 8A to FIG. 8E are figures for describing processing according to the reading system according to the embodiment;

FIG. 9 is a table illustrating the correspondence between the numerals and the combinations of the determination results;

DETAILED DESCRIPTION

Figure 1:
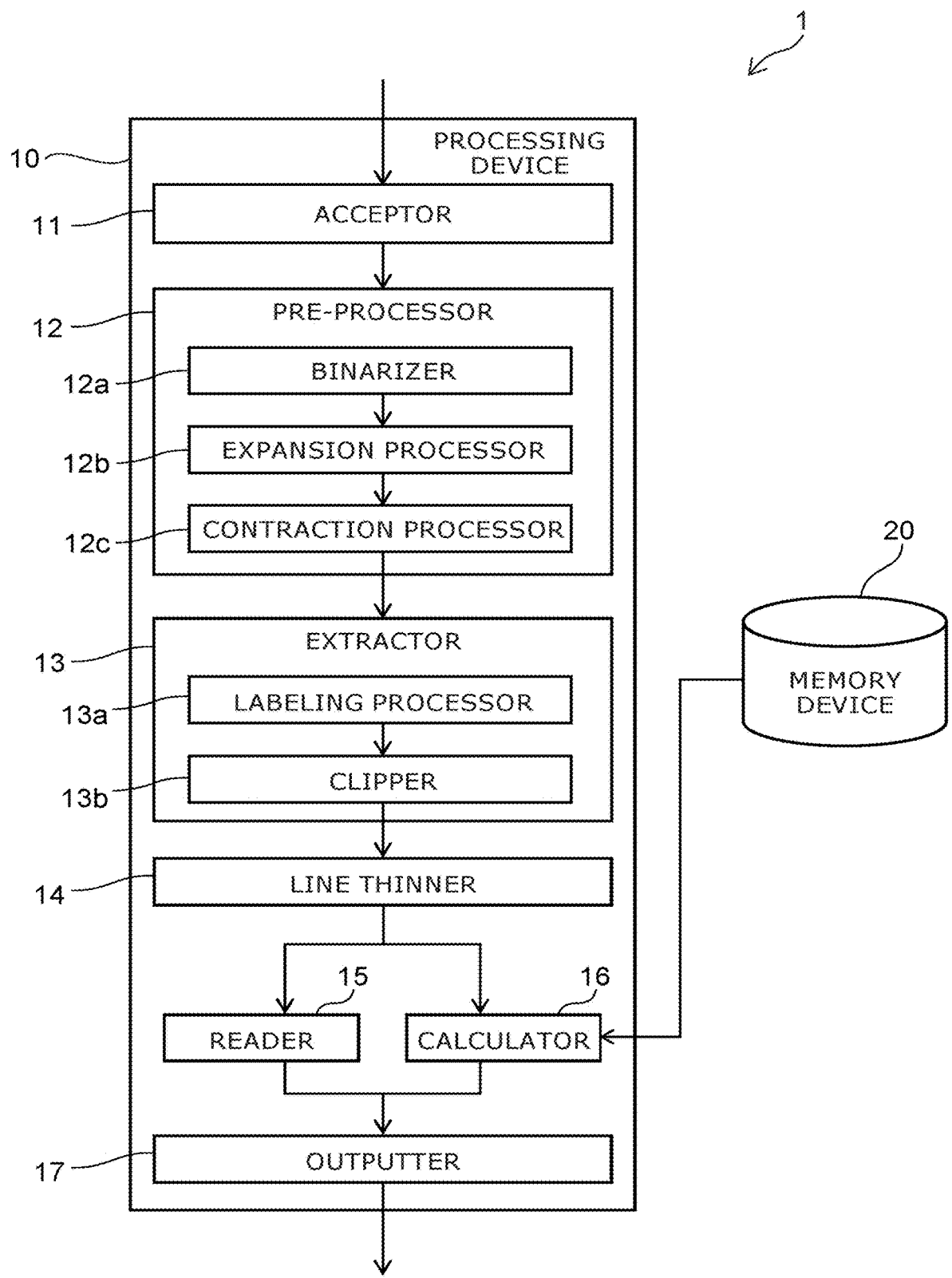
FIG. 1 is a block diagram illustrating a configuration of a reading system according to an embodiment.

According to an embodiment, a reading system includes a reader and a calculator. The reader reads, from a character image, a character that is displayed by a segment display including multiple segments. The calculator performs at least one of first processing, second processing, third processing, or fourth processing. In the first processing, the calculator sets multiple determination regions corresponding to the multiple segments in the character image, and calculates a first score based on a state of pixels of the character in each of the multiple determination regions. In the second processing, the calculator extracts, from the pixels of the character, pixels matching a preset mask, and calculates a second score based on a match ratio between the pixels of the character and the extracted pixels. In the third processing, the calculator calculates a third score based on a ratio of a length of the character image in a first direction and a length of the character image in a second direction crossing the first direction. In the fourth processing, the calculator detects an existence or absence of a portion of the character in each of the multiple determination regions and calculates a fourth score based on a comparison result between the detected result and preset patterns. The calculator calculates a certainty of the reading by using at least one of the first score, the second score, the third score, or the fourth score.

Various embodiments are described below with reference to the accompanying drawings.

In the specification and drawings, components similar to those described previously are marked with the same reference numerals, and a detailed description is omitted as appropriate.

FIG. 1 is a block diagram illustrating a configuration of a reading system according to an embodiment.

The reading system according to the embodiment is used to read a character displayed in a segment display from an image in which the segment display is imaged. One character is displayed in the segment display by multiple segments. The character is displayed by at least a portion of the multiple segments being lit and by the remaining segments being unlit. The reading system according to the embodiment reads the character from the image. Multiple characters may be displayed in the segment display. In such a case, each of the multiple characters is displayed by at least a portion of the multiple segments being lit.

The number of segments included in the segment display reading object is arbitrary. For example, the segment display to be read may be a so-called seven-segment display in which one character is displayed by seven segments. The seven-segment display displays a character (a numeral) representing a number. A fourteen-segment display or a sixteen-segment display that displays the alphabet may be the reading object. In the description herein, mainly, the reading system according to the embodiment reads a numeral displayed in a seven-segment display.

As illustrated in FIG. 1, the reading system 1 according to the embodiment includes a processing device 10. The processing device 10 includes an acceptor 11, a pre-processor 12, an extractor 13, a line thinner 14, a reader 15, a calculator 16, and an outputter 17.

FIG. 2A to FIG. 2D illustrate processing according to the reading system according to the embodiment.

An image in which a segment display is imaged is input to the processing device 10. The acceptor 11 accepts the image that is input. For example, an external imaging device generates the image by imaging the segment display. The imaging device transmits the image to the processing device 10. Or, the image may be transmitted from an external memory device to the processing device 10. The acceptor 11 accepts the image transmitted to the processing device 10. Objects other than the segment display may be imaged in the image. Here, the image that is accepted by the acceptor 11 is called the input image.

Figure 2A:
FIG. 2A to FIG. 2D illustrate processing according to the reading system according to the embodiment.

FIG. 2A is an example of an input image A transmitted to the processing device 10. In the example of FIG. 2A, multiple numerals are displayed in the segment display. Each of the numerals is displayed by multiple segments.

The pre-processor 12 applies pre-processing to the input image before reading the numeral displayed in the segment display. The accuracy of the reading of the numeral can be increased by the pre-processing. For example, the pre-processor 12 includes a binarizer 12a, an expansion processor 12b, and a contraction processor 12c.

The binarizer 12a binarizes the input image. The binarized input image is illustrated using two mutually-different colors (a first color and a second color). Here, a case will be described where the first color is white and the second color is black.

For example, the background of the segment display is a dark color. The segments that are lit are brighter than the background. Therefore, in the binarized input image, the lit segments are illustrated using white. The unlit segments and the background are illustrated using black. In other words, in the binarized input image, the numeral is shown by the white pixels.

Or, in a segment display in which a liquid crystal display is used, the character is illustrated using a color that is darker than the background. In such a case, reversal of the colors of the pixels is performed for the binarized input image. By reversing, the numeral is shown by the white pixels similarly to the case described above. Hereinafter, the case is described where the lit segments are illustrated using white, and the unlit segments and the background are illustrated using black.

For example, the input image is digitized into data as an RGB color model shown using the three primary colors of red (Red), green (Green), and blue (Blue). In the binary processing, first, the input image is converted into data in HSV color space defined by the three components of hue (Hue), saturation (Saturation), and luminance (Value).

Then, a histogram analysis of the data in HSV color space is performed. Continuing, a threshold is calculated based on the histogram of the pixels. The pixels are binarized into white and black based on the threshold and the histogram of the pixels.

The expansion processor 12b expands the white pixels in the binary image. For example, the expansion processor 12b modifies the pixels adjacent to the white pixels to be white. Adjacent pixels that are white originally are not modified. For example, there are cases where black pixels are interspersed in portions where white pixels are concentrated due to the effects of noise, etc. The expansion processing modifies the interspersed black pixels to be white pixels. Thereby, the effects of noise, etc., can be reduced, and the reading accuracy of the numeral can be increased. Also, the expansion processing can connect clusters of proximal white pixels to each other. By connecting clusters of proximal white pixels to each other, one cluster of pixels that corresponds to one numeral is generated. Thereby, the extraction of the character image described below is made easy.

The contraction processor 12c contracts the white pixels in the binary image. For example, the contraction processor 12c modifies pixels adjacent to black pixels to be black. Adjacent pixels that are black originally are not modified. The contraction processing reduces the number of expanded white pixels.

Figure 2B:

FIG. 2B is an example of the input image A on which the pre-processing (the binarization, the expansion processing, and the contraction processing) has been performed. As illustrated in FIG. 2B, clusters of white pixels corresponding to the numerals are generated by such pre-processing.

The pre-processor 12 may perform the expansion processing and the contraction processing described above multiple times. For example, the pre-processor 12 performs the contraction processing two or more times after performing the expansion processing two or more times. The pre-processor 12 may perform the expansion processing two or more times after performing the contraction processing two or more times. For example, the implementation count of the expansion processing and the implementation count of the contraction processing are set to be the same. Or, the implementation count of the expansion processing may be different from the implementation count of the contraction processing. For example, the implementation count of the expansion processing may be set to be more than the implementation count of the contraction processing.

The pre-processor 12 may perform a processing set including one expansion processing and one contraction processing multiple times. In one processing set, one of the expansion processing or the contraction processing is performed after the other is performed. The sequence of the expansion processing and the contraction processing in one processing set may be different from the sequence of the expansion processing and the contraction processing in another processing set.

The pre-processor 12 also may perform other processing. For example, when an object other than the segment display is included in the input image, the pre-processor 12 may cut out the portion where the segment display is imaged from the input image. If the input image is distorted, the pre-processor 12 may perform a correction of the distortion.

The pre-processor 12 outputs the processed input image to the extractor 13. The extractor 13 extracts a character image from the input image. The character image is a portion of the input image in which one numeral displayed by the segment display is imaged.

For example, the extractor 13 includes a labeling processor 13a and a clipper 13b. The binarized input image is output from the pre-processor 12 to the extractor 13. The labeling processor 13a assigns a label (a value) to the cluster of white pixels. The "cluster of white pixels" refers to a portion in which white pixels are adjacent to each other and form one white clump. In the cluster of white pixels, one white pixel is adjacent to at least one white pixel. One cluster of white pixels corresponds to one numeral displayed by the segment display. When multiple clusters of white pixels exist, the labeling processor 13a assigns a label to each cluster of white pixels.

Figure 2C:
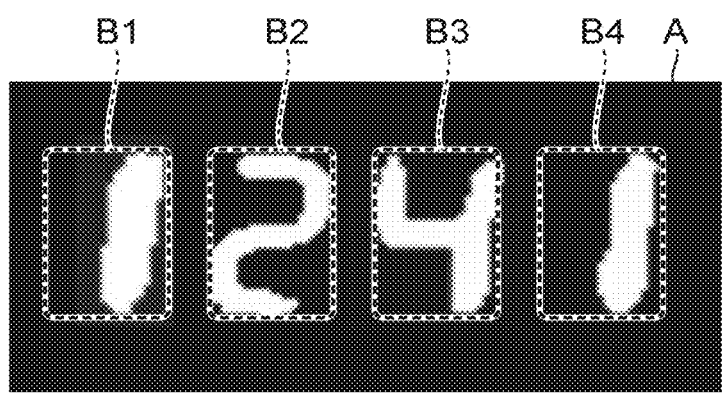

The clipper 13b cuts out the portion including the labeled cluster from the input image. The cut-out portion is used as the character image. When multiple labeled clusters exist, the clipper 13b cuts out multiple character images. The multiple character images respectively include the multiple labeled clusters. For example, the character image is quadrilateral. The character image includes multiple pixels arranged in a first direction and in a second direction crossing the first direction. For example, the character image is cut out so that the size is a preset value. The size of the cut-out character image corresponds to the size of a mask described below. FIG. 2C illustrates the input image A and character images B1 to B4.

Figure 2D:
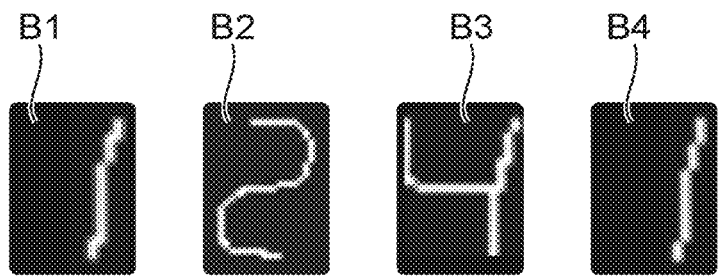

The extractor 13 outputs the extracted (cut out) character image to the line thinner 14. The line thinner 14 performs line thinning of the character image. Namely, the line thinner 14 processes the cluster of white pixels included in the character image to cause the line width to be one pixel. FIG. 2D illustrates the results of thinning the character images B1 to B4 illustrated in FIG. 2C.

The line thinner 14 may thin the lines of the binary image output from the pre-processor 12. For example, the clipper 13b stores the position where the character image is to be cut out. The line thinner 14 outputs the thinned binary image to the extractor 13. The clipper 13b cuts out a portion of the thinned binary image at the stored cut-out position. The thinned character image illustrated in FIG. 2D is obtained thereby.

For example, the reader 15 reads a character from the thinned character image. The reader 15 may read the character from the character image before the line thinning. The calculator 16 calculates scores by using the extracted character image. Specifically, the calculator 16 performs the following first to seventh processing. Also, the calculator 16 calculates a certainty of the reading by using first to seventh scores obtained by performing the first to seventh processing.

Examples will now be described in which the scores and the certainty are calculated to be higher as the goodness of the character image and the likelihood of reading the numeral correctly increase. High scores and certainties indicate that the reliability of the reading is higher. For example, the character image being good refers to a state in which an object other than the character is not included in the character image, the resolution is sufficiently high, the distortion is small, etc. The scores and the certainty are not limited to the example; the scores and the certainty may be calculated to be lower as the goodness of the character image increases. In such a case, lower scores and certainties indicate that the reliability of the reading is higher.

FIG. 3A, FIG. 3B, FIG. 4A to FIG. 4E, FIG. 5A to FIG. 5C, FIG. 6A to FIG. 6F, FIG. 7A, FIG. 7B, FIG. 8A to FIG. 8E, FIG. 10A to FIG. 10C, FIG. 11A, and FIG. 11B are figures for describing processing according to the reading system according to the embodiment.

FIG. 9 is a table illustrating the correspondence between the numerals and the combinations of the determination results.

In the first processing, the calculator 16 sets multiple determination regions in the thinned character image. It is sufficient for the number of determination regions that are set to be not less than the number of segments used to display one character. For example, the number of determination regions that are set is equal to the number of segments used to display one numeral. For example, seven determination regions are set in one character image when a numeral displayed by a seven-segment display is read. The positions of the determination regions are determined based on the size of the extracted character image. For example, a memory device 20 stores information relating to the set positions of the determination regions. The calculator 16 determines the positions and the sizes of the determination regions based on the information stored in the memory device 20 and the size of the character image. Or, the positions and the sizes of the determination regions may be predetermined when the size of the cut-out character image is predetermined.

Figure 3A:
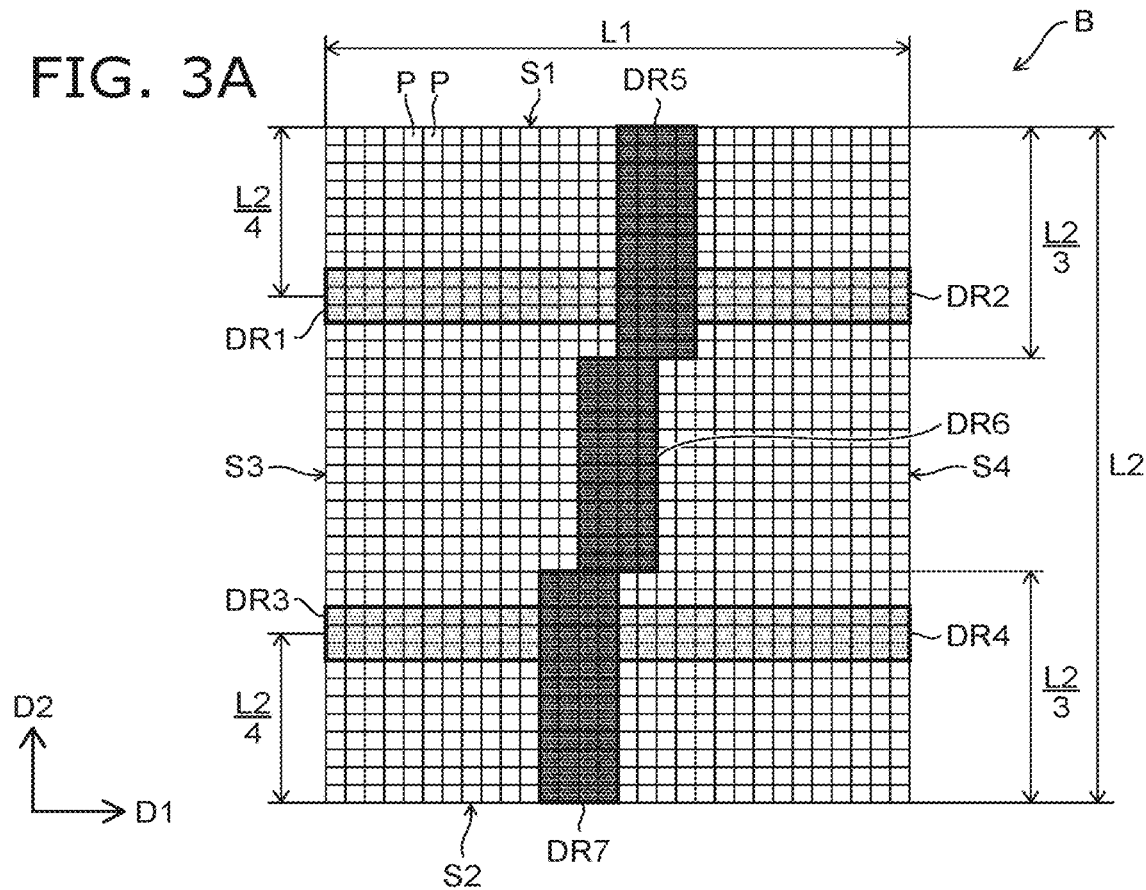

Here, an example will be described in which the positions and the sizes of the determination regions are determined based on the size of the character image. FIG. 3A is a schematic view for describing the method for setting the determination regions. A character image B illustrated in FIG. 3A includes multiple pixels P. Determination regions DR1 to DR7 are set in the character image B. The determination regions DR1 and DR2 are arranged along a first direction D1 (the lateral direction). The determination regions DR3 and DR4 are arranged along the first direction D1. The determination regions DR1 and DR2 are separated from the determination regions DR3 and DR4 in a second direction D2 (the vertical direction). The determination regions DR5 to DR7 are arranged along the second direction D2.

As in the determination regions DR5 to DR7 illustrated in FIG. 3A, the arrangement direction of a portion of the determination regions may not be parallel to the second direction D2 and may be tilted with respect to the second direction D2. For example, the angle between the arrangement direction of the portion of the determination regions and the second direction D2 is set to be greater than 0 degrees and not more than 20 degrees. Similarly, the arrangement direction of another portion of the determination regions may be tilted with respect to the first direction D1. For example, the angle between the arrangement direction of the other portion of the determination regions and the first direction D1 is set to be greater than 0 degrees and not more than 20 degrees. Such an arrangement also is included in the case where the multiple determination regions are arranged along the first direction D1 or the second direction D2.

The length (the number of pixels) in the first direction D1 of the character image B illustrated in FIG. 3A is taken as L1. The length in the second direction D2 of the character image B is taken as L2. The character image B has first to fourth sides S1 to S4. The first side S1 and the second side S2 are parallel to the first direction D1. The third side S3 and the fourth side S4 are parallel to the second direction D2.

For example, the setting of the determination regions DR1 and DR2 is referenced to a position separated L2/4 from the first side S1. For example, the setting of the determination regions DR3 and DR4 is referenced to a position separated L2/4 from the second side S2. For example, the setting of the determination regions DR5 to DR7 is referenced to the middle positions of the third side S3 and the fourth side S4. For example, the determination regions DR5 and DR7 are set to positions shifted in the first direction D1 from the middle positions. For example, the length in the second direction D2 is set to L2/3 for each of the determination regions DR5 to DR7. Information that relates to the positions used as these references are stored in, for example, the memory device 20. Each determination region is set so that the determination region does not overlap the other determination regions. Each determination region includes the pixel P at the position used as the reference, and the pixels P at the periphery of the pixel P. For example, the sizes of the determination regions are set according to the size of the character image B.

The positions that are used as the references for setting the determination regions for the size of the character image and the sizes of the determination regions for the size of the character image are modifiable as appropriate according to the segment display reading object, the characteristics of the input image, etc. The positions of the multiple determination regions may be determined based on the size (the length in the first direction and the length in the second direction) of the character image.

The calculator 16 determines the state of the thinned pixels in each of the determination regions. The number of lines overlapping the determination region may be used as the state of the pixels. The line is a portion of the multiple pixels of the numeral and refers to an object in which the pixels are continuous. For example, in the example illustrated in FIG. 3A and FIG. 3B, if the character image is clear, the number of lines detected in each determination region is one at most. When two or more lines are detected in one determination region, there is a possibility that the character image is unclear, the character is distorted, or the character is not imaged correctly.

The calculator 16 calculates the first score based on the states of the pixels in the determination regions. For example, the calculator 16 calculates the first score to be lower as more lines are detected in one determination region. Also, the calculator 16 calculates the first score to be lower as the number of determination regions where two or more lines are detected increases. The calculator 16 may reduce the first score when the line is discontinuous in the determination region. The calculator 16 may reduce the first score when another line is scattered proximally to one line.

The calculator 16 may use the angle of the line as the state of the pixels. For example, when the character image is clear in the example illustrated in FIG. 3A and FIG. 3B, lines that extend along the second direction D2 are detected in the determination regions DR1 to DR4. Lines that extend along the first direction D1 are detected in the determination regions DR5 to DR7. The calculator 16 calculates the first score to be lower as the line detected in each determination region is tilted more with respect to a preset direction.

Or, the calculator 16 may calculate the first score based on both the number of lines and the angles of the lines in each determination region. The reliability of the certainty calculated using the first score can be increased thereby.

Figure 5A:
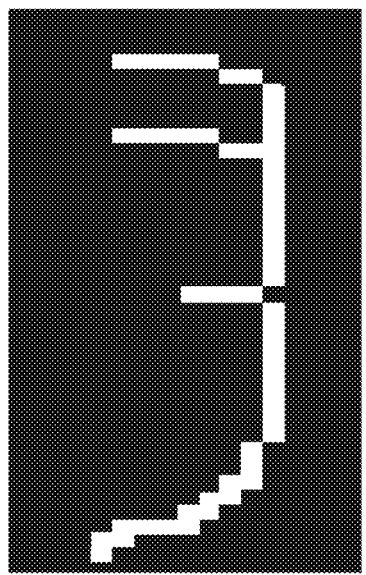
Figure 5B:
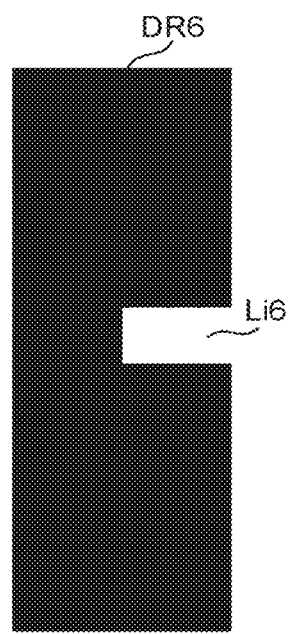
Figure 5C:
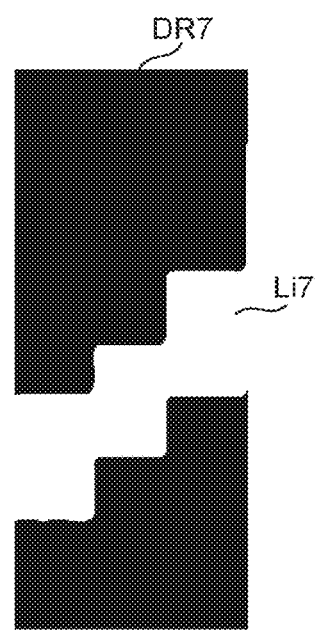
Figure 8A:
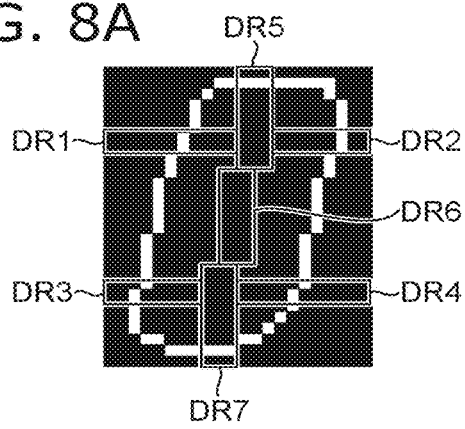
Figure 8D:
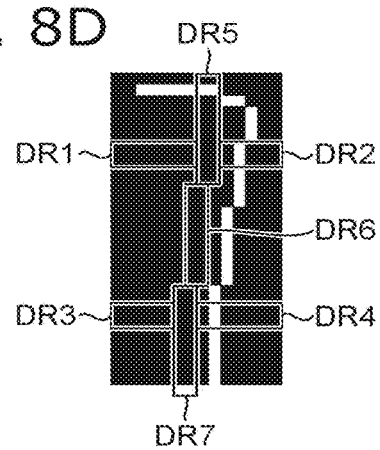
Figure 8B:
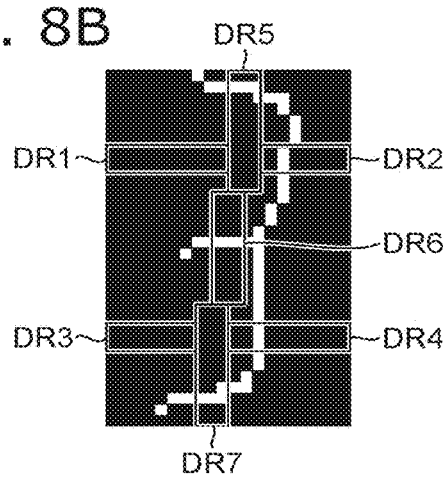
Figure 8E:
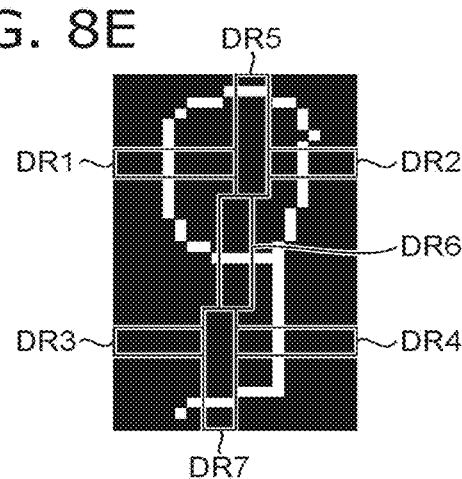
Figure 8C:
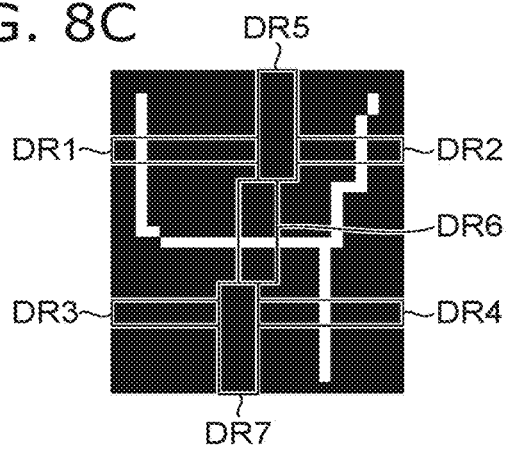

FIG. 4A, FIG. 4C, and FIG. 5A are examples of character images. FIG. 4B is a portion of the character image of FIG. 4A. FIG. 4B illustrates an enlargement of the determination region DR5 set in the character image of FIG. 4A. FIG. 4D and FIG. 4E are portions of the character image of FIG. 4C. FIG. 4D illustrates an enlargement of the determination region DR5 set in the character image of FIG. 4C. FIG. 4E illustrates an enlargement of the determination region DR6 set in the character image of FIG. 4C. FIG. 5B and FIG. 5C are portions of the character image of FIG. 5A. FIG. 5B illustrates an enlargement of the determination region DR6 set in the character image of FIG. 5A. FIG. 5C illustrates an enlargement of the determination region DR7 set in the character image of FIG. 5A.

The calculator 16 searches for lines extending in a prescribed direction in each determination region. Specifically, the calculator 16 searches for lines extending in the second direction D2 in the determination regions DR1 to DR4 which extend in the first direction D1. The calculator 16 searches for lines extending in the first direction D1 in the determination regions DR5 to DR7 which extend in the second direction D2.

In the example of FIG. 4B, a line Li1 in which the pixels are continuous extends along the first direction D1. Also, the number of lines existing in the determination region DR5 is one. Therefore, the first score is calculated to be high for the determination region DR5.

In the example of FIG. 4D, multiple lines Li2 and Li3 exist along the first direction D1 in the determination region DR5. Therefore, the first score is calculated to be low for the determination region DR5.

In the example of FIG. 4E, multiple lines Li4 and Li5 exist in the determination region DR6. The position in the first direction D1 of the end portion of the line Li4 matches the position in the first direction D1 of the end portion of the line Li5. When the distance in the second direction D2 between these lines is short, it is considered that the lines Li4 and Li5 should be illustrated as one line. For example, when the distance in the second direction D2 between the lines Li4 and Li5 is not more than a preset value, the calculator 16 determines that lines that should be displayed as one line are scattered, and calculates the first score to be low.

In the example of FIG. 5B, the line Li6 is discontinuous in the determination region. In the example of FIG. 5C, the angle of the line Li7 is tilted with respect to the first direction D1. In the example illustrated in FIG. 5B or FIG. 5C, the first score is calculated to be low for the determination regions DR6 and DR7.

In the second processing, the calculator 16 refers to the memory device 20 and calculates a match ratio by using a mask and one character image. The match ratio indicates how clearly the character based on the multiple segments appears in the character image.

First, the calculator 16 calculates an AND operation of the character image and the mask. The mask corresponds to the state in which all of the multiple segments for displaying one numeral are lit. In the processed image obtained by the AND operation, the regions that are illustrated using white are only the regions illustrated using white in the mask and illustrated using white in the character image.

The calculator 16 calculates the match ratio of the character image with respect to the processed image as the match ratio. Namely, a proportion (a1/a2) of a surface area a1 of the region illustrated using white in the processed image to a surface area a2 of the region illustrated using white in the character image is calculated as the match ratio. The surface area in each image corresponds to the number of pixels illustrated using white. Instead of such a calculation, the calculator 16 may calculate the proportion of the surface area of the region illustrated using black in the character image to the surface area of the region illustrated using black in the processed image as the match ratio.

FIG. 6A and FIG. 6D are examples of character images. FIG. 6B and FIG. 6E are examples of the mask. FIG. 6C and FIG. 6F are images illustrating the results of the AND operation.

As an example, the processed image illustrated in FIG. 6C is obtained by an AND operation of the character image illustrated in FIG. 6A and the mask illustrated in FIG. 6B. The calculator 16 calculates the match ratio by using the image illustrated in FIG. 6A and the image illustrated in FIG. 6C. As another example, the processed image illustrated in FIG. 6F is obtained by an AND operation of the character image illustrated in FIG. 6D and the mask illustrated in FIG. 6E. The calculator 16 calculates the match ratio by using the image illustrated in FIG. 6D and the image illustrated in FIG. 6F.

Compared to the change from the image of FIG. 6D to the image of FIG. 6F, the change from the image of FIG. 6A to the image of FIG. 6C is small. Therefore, the match ratio is calculated to be higher for the image of FIG. 6A than for the image of FIG. 6D. For example, the calculator 16 outputs the calculated match ratio as the second score. In other words, a higher second score is output as the match ratio increases. The calculator 16 may output, as the second score, another value calculated based on the match ratio.

In the third processing, the calculator 16 calculates a ratio of lengths of the character image. The calculator 16 calculates the third score to be higher as the ratio approaches a preset value. The value corresponds to the ratio of the lengths of a cluster of segments for displaying one numeral.

For example, the calculator 16 calculates the ratio of a length L3 in the first direction D1 and a length L4 in the second direction D2 for the character image illustrated in FIG. 7A. The character image of FIG. 7A is clear, and the distortion of the imaged character is small. Therefore, the difference between the preset value and the ratio of the length L3 and the length L4 is small. The calculator 16 calculates the third score to be high for the character image illustrated in FIG. 7A.

On the other hand, in the character image illustrated in FIG. 7B, the length in the first direction D1 is long due to the effects of the reflection of light of the segment display. Therefore, the difference between the preset value and the ratio of a length L5 and a length L6 is large. The calculator 16 calculates the third score to be low for the character image illustrated in FIG. 7B. Other than the reflection of the light, the ratio of the length in the first direction D1 and the length in the second direction D2 also may change from the preset value due to effects such as adhered matter on the segment display, noise in the image, etc.

In the fourth processing, similarly to the first processing, the calculator 16 sets the multiple determination regions in one character image. The method for setting the determination regions is similar to that of the first processing. The calculator 16 detects the existence or absence of a portion of the character in each determination region. As one specific example, the calculator 16 detects the number of pixels of the character in each determination region. When the lit segments are illustrated using white, the calculator 16 detects the number of white pixels in each determination region. The calculator 16 determines whether or not a portion of the numeral exists in each determination region by comparing the detected number of pixels to a preset threshold. Specifically, the calculator 16 determines a portion of the numeral to exist in the determination region when the detected number of pixels is not less than a threshold.

For example, the threshold is set to 1 when the multiple determination regions are set for a character image that has undergone line thinning. The threshold may be greater than 1 when the multiple determination regions are set for a character image without line thinning.

Figure 3B:
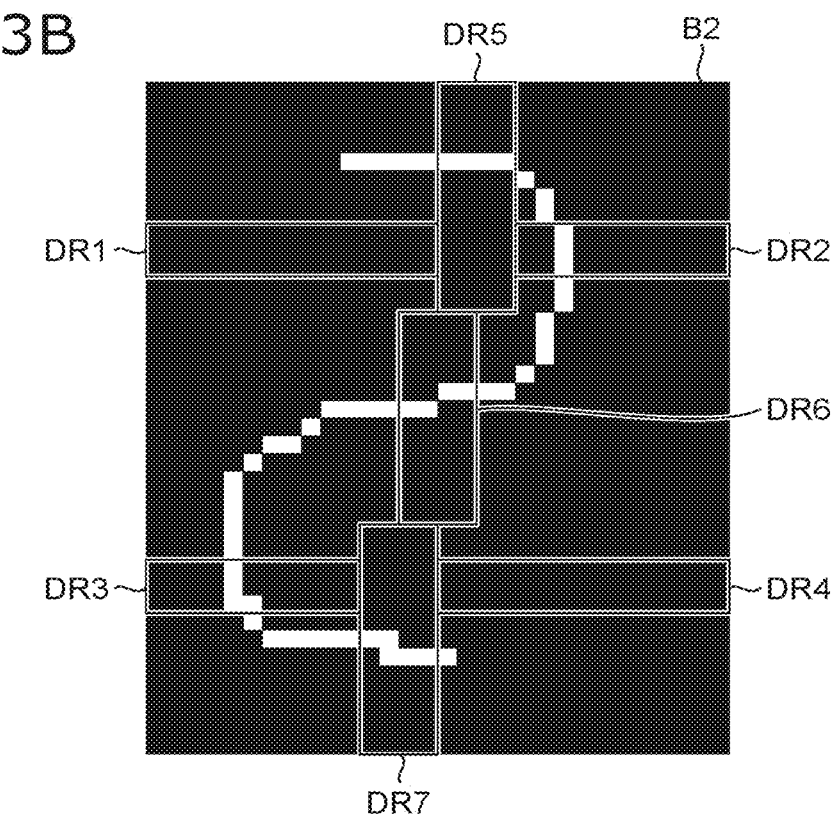

For example, the calculator 16 represents the determination result in each determination region using "0" or "1". "0" indicates that a portion of the numeral does not exist in the determination region. "1" indicates that a portion of the numeral exists in the determination region. In the example of FIG. 3B, a portion of the numeral is determined to exist in the determination regions DR2, DR3, and DR5 to DR7. For example, this result is represented as "0110111" using 0 and 1.

FIG. 8A to FIG. 8E illustrate character images in which other numerals are imaged, and examples of setting the determination regions in each character image. For the character image illustrated in FIG. 8A to FIG. 8E as well, similarly to FIG. 3B, the multiple determination regions are set, and the existence or absence of a portion of the numeral in each determination region is determined.

The calculator 16 refers to the memory device 20. The patterns of the numerals that can be displayed by the segment display are stored in the memory device 20. The patterns are represented using 0 and 1 similarly to the combinations of the determination results of the calculator 16. FIG. 9 illustrates the patterns stored in the memory device 20. The calculator 16 searches for a pattern that matches the combination of the determination results.

For example, in the example of FIG. 3B, the combination of the determination results is represented by "0110111". The calculator 16 searches for a pattern that matches the combination. As a result of the search, the combination of the determination results of the calculator 16 matches the pattern corresponding to the numeral "2". The calculator 16 calculates the fourth score to be high when there is a matching pattern. When there is no matching pattern, the calculator 16 calculates the fourth score to be low.

In the fifth processing, the calculator 16 calculates the fifth score based on the fluctuation of the positions of the multiple characters and the arrangement direction of the multiple characters.

First, the calculator 16 calculates the centroid positions of the multiple character images in the input image. The calculator 16 generates a straight line based on the multiple centroid positions. The straight line is, for example, a regression line of the multiple centroid positions. The calculator 16 determines the fluctuation of the multiple centroid positions by using the regression line. For example, the fluctuation is represented by the standard deviation or the mean squared error. The calculator 16 calculates the fifth score to be lower as the fluctuation increases.

Also, the calculator 16 calculates the difference between a preset reference direction and the arrangement direction of the multiple characters. The calculator 16 calculates the fifth score to be lower as the difference increases. For example, the arrangement direction of the characters is represented by a regression line. The calculator 16 uses the angle between the regression line and a line along the reference direction as the difference between the arrangement direction and the reference direction. The calculator 16 may compare the angle to a preset threshold. The calculator 16 calculates the fifth score to be low when the angle is greater than the threshold.

Figure 10A:
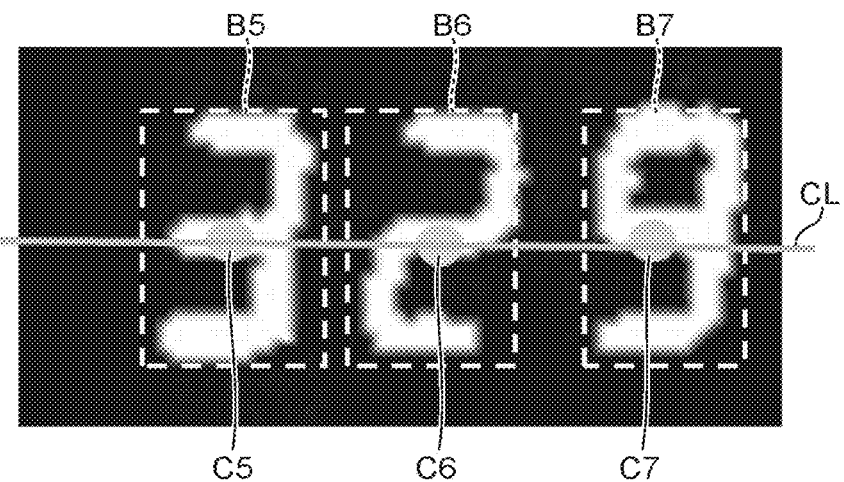
FIG. 10A to FIG. 10C are figures for describing processing according to the reading system according to the embodiment.

For example, the calculator 16 calculates the centroid position for each of multiple character images B5 to B7 illustrated in FIG. 10A. As a result, for example, centroid positions C5 to C7 are calculated. The calculator 16 generates a straight line CL based on the centroid positions C5 to C7. For example, the reference direction is set to be parallel to the first direction D1. In the example illustrated in FIG. 10A, the fluctuation of the centroid positions C5 to C7 is small. Also, the straight line CL extends along the first direction D1. Therefore, the fifth score is calculated to be high for the multiple character images illustrated in FIG. 10A.

Figure 10B:
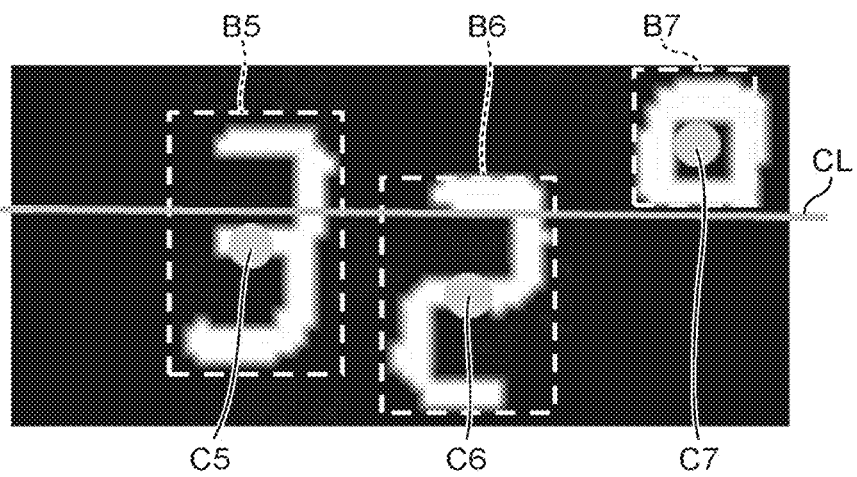
Figure 10C:
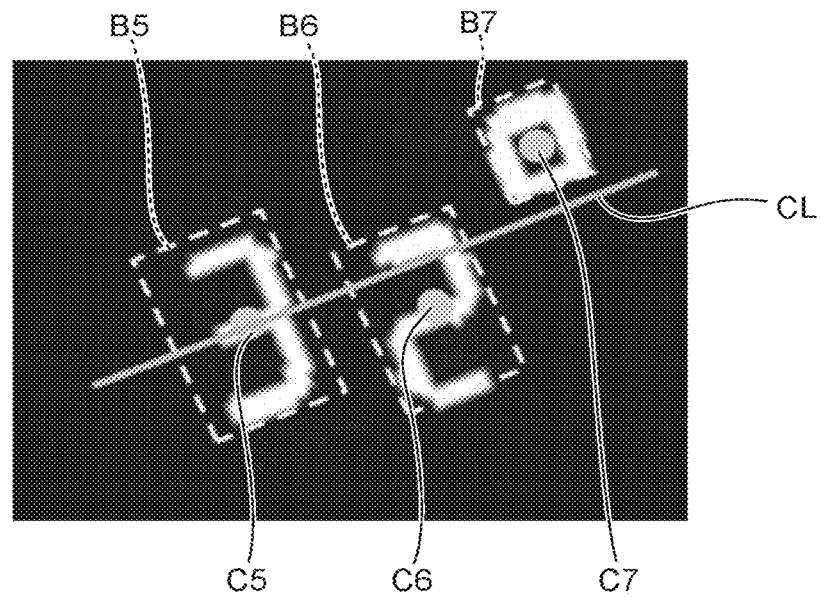

In the example illustrated in FIG. 10B, the straight line CL extends along the first direction D1, but the fluctuation of the centroid positions C5 to C7 is large. Therefore, the fifth score based on the multiple character images illustrated in FIG. 10B is calculated to be less than the fifth score based on the multiple character images illustrated in FIG. 10A. Also, the straight line CL is tilted with respect to the first direction D1 in the example illustrated in FIG. 10C. Therefore, the fifth score based on the multiple character images illustrated in FIG. 10B and the fifth score based on the multiple character images illustrated in FIG. 10C are calculated to be less than the fifth score based on the multiple character images illustrated in FIG. 10A.

In the sixth processing, the calculator 16 compares the number of characters imaged in the image to a minimum character count and a maximum character count that are preset. For example, the calculator 16 compares the number of character images (the number of labeled clusters) to the minimum character count and the maximum character count. The calculator 16 calculates the sixth score to be high when the number of characters is not less than the minimum character count and not more than the maximum character count. The calculator 16 calculates the sixth score to be low when the number of characters is less than the minimum character count or greater than the maximum character count.

In the seventh processing, the calculator 16 determines whether or not a decimal point is recognized in the input image. Whether or not the segment display imaged in the input image includes a decimal point is preregistered in the memory device 20. The calculator 16 compares the recognition result to the information registered in the memory device 20. The calculator 16 calculates the seventh score to be high when the recognition result matches the information registered in the memory device 20. The calculator 16 calculates the seventh score to be low when the recognition result does not match the information registered in the memory device 20. For example, the calculator 16 calculates the seventh score to be low when a decimal point is not recognized even though the segment display is configured to display a decimal point.

Figure 11A:
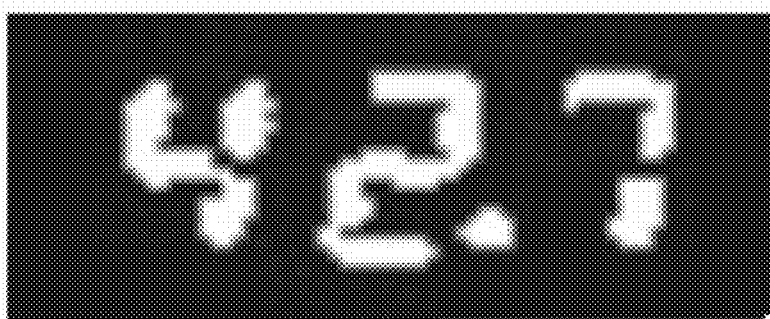
FIG. 11A and FIG. 11B are figures for describing processing according to the reading system according to the embodiment.
Figure 11B:
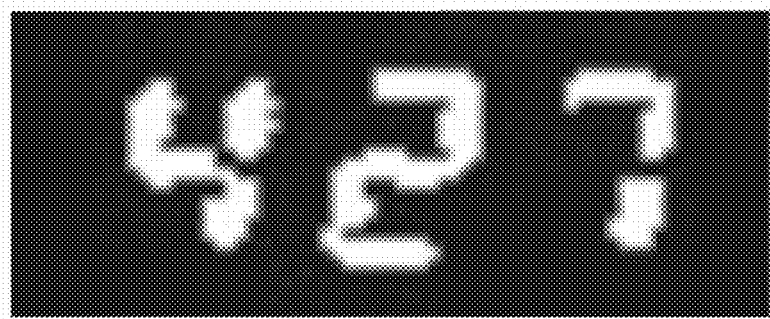

FIG. 11A is an example of an image in which a decimal point is recognized. FIG. 11B is an example of an image in which a decimal point is not recognized. For example, when it is preregistered that the display of the segment display includes a decimal point, the seventh score based on the image of FIG. 11A is calculated to be high, and the seventh score based on the image of FIG. 11B is calculated to be low.

The calculator 16 calculates the certainty of the reading of the numeral by the reader 15 by using the first to seventh scores described above. For example, the calculator 16 uses the total of the first to seventh scores as the certainty. The calculator 16 may multiply at least a portion of the first to seventh scores with weights and use the total as the certainty. Or, the calculator 16 may use, as the certainty, the lowest score from a value calculated using a portion of the first to seventh scores and from the other portion of the first to seventh scores.

When multiple character images are cut out from the input image, the first to fourth scores are calculated for each character image.

For example, the calculator 16 compares the multiple first scores and uses the lowest first score to calculate the certainty. Similarly, the calculator 16 calculates the certainty by using the lowest second score of the multiple second scores, the lowest third score of the multiple third scores, and the lowest fourth score of the multiple fourth scores.

Or, the calculator 16 may calculate the total of the first to fourth scores for each of the character images. The calculator 16 selects the lowest total value from the multiple total values and uses the selected total value to calculate the certainty. The calculator 16 may weight each score when calculating the total values.

For example, the outputter 17 outputs, to an external output device, the certainty and information based on the numeral that is read. For example, the information includes the numeral that is read. The information may include results calculated based on the numeral that is read. The information may include values calculated based on multiple numerals that are read. The outputter 17 also may output the image from which the reader 15 read the numeral, the time when the numeral was read, etc. The outputter 17 may output a file including these data in a prescribed format such as CSV, etc. The outputter 17 may transmit the data to an external server by using FTP (File Transfer Protocol), etc. Or, the outputter 17 may insert the data into an external database server by performing database communication and using ODBC (Open Database Connectivity), etc.

The processing device 10 includes, for example, a processing circuit made of a central processing unit. The functions of the acceptor 11, the pre-processor 12, the extractor 13, the line thinner 14, the reader 15, the calculator 16, and the outputter 17 may be realized by multiple processing devices 10. The memory device 20 includes, for example, at least one of a hard disk drive (HDD), a network-attached hard disk (NAS), an embedded multimedia card (eMMC), a solid-state drive (SSD), or a solid-state hybrid drive (SSHD). The processing device 10 and the memory device 20 are connected by a wired or wireless method. Or, the processing device 10 and the memory device 20 may be connected to each other via a network.

Figure 12:
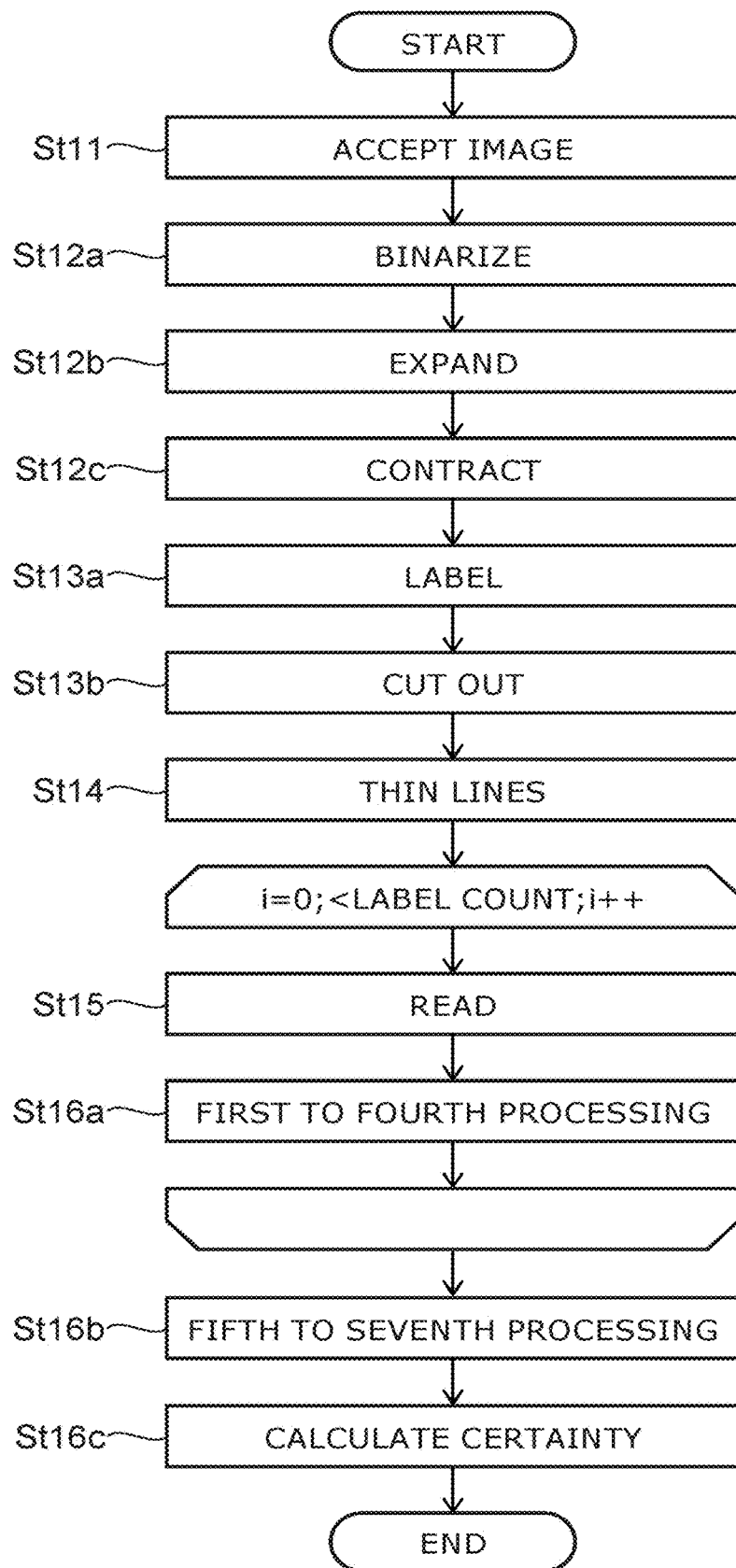
FIG. 12 is a flowchart illustrating processing according to the reading system according to the embodiment.

FIG. 12 is a flowchart illustrating processing according to the reading system according to the embodiment.

The acceptor 11 accepts an input image transmitted to the processing device 10 (step St11). The binarizer 12a binarizes the input image (step St12a). The expansion processor 12b performs expansion processing of the binarized input image (step St12b). The contraction processor 12c performs contraction processing of the binarized and expanded input image (step St12c). The labeling processor 13a assigns a label to the cluster of white pixels included in the input image (step St13a). The clipper 13b cuts out the character image from the input image (step St13b). The line thinner 14 thins the cluster of white pixels in the input image or the character image (step St14). The reader 15 reads the numeral shown in one character image (step St15). The calculator 16 performs the first to fourth processing for the one character image and calculates the first to fourth scores (step St16a).

Steps St15 and St16a are repeated until i is equal to the label count. In other words, initially, i is set to 0. 1 is added to i when the reading of the numeral and the first to fourth processing are completed for one cluster of white pixels. Steps St15 and St16a are repeated while i is less than the label count. In other words, when multiple character images are cut out, steps St15 and St16a are performed for each character image.

The calculator 16 performs the fifth to seventh processing and calculates the fifth to seventh scores (step S16b), and the calculator 16 calculates the certainty by using the first to seventh scores (step St16c).

The sequence of the steps illustrated in the flowchart of FIG. 12 is modifiable as appropriate. The fifth to seventh processing may be performed before the first to fourth processing. For example, the reading of step St15 may be performed in parallel to the first to seventh processing. The fifth to seventh processing may be performed in parallel to the first to fourth processing. Or, the processing (e.g., the second processing, the third processing, the fifth to seventh processing, etc.) that uses a character image without thinned lines may be performed before the line thinning of step St14.

Effects of the embodiment will now be described.

According to the reading system 1 according to the embodiment, the certainty of the reading is calculated when reading the numeral. For example, the user can use the certainty to confirm how much the numeral that is read can be trusted. Even when an abnormal numeral is output, the user can confirm based on the certainty whether or not it is likely that the segment display actually would display such a numeral.

The reading system 1 may output the image from which the numeral is read in addition to the numeral and the certainty. Thereby, even when the certainty is low, the user easily can confirm the numeral that is actually displayed from the image.

According to the embodiments, the reliability of the reading system 1 can be increased.

In the example of the embodiments described above, all of the first to seventh processing are performed, and the certainty is calculated by using the first to seventh scores. The reading system 1 may perform at least one of the first to seventh processing and may calculate the certainty by using at least one of the calculated first to seventh scores.

For example, the reading system 1 performs at least one of the first to fourth processing. The first to fourth processing are processing corresponding to features of the segment display, and the reliability of the certainty can be increased by performing at least one of such processing. Favorably, the reading system 1 performs at least one of the first processing or the second processing. The first processing and the second processing are processing corresponding to the display form of the segment display, and the reliability of the certainty can be increased further by performing at least one of such processing.

For example, the reading system 1 may perform at least one of the first processing or the second processing and at least one of the third processing or the fourth processing. Favorably, the reading system 1 also performs at least one of the fifth to seventh processing. The reliability of the certainty can be increased by calculating the certainty by performing more processing and by using the scores calculated by such processing.

In the reading system 1, line thinning is performed when reading the character displayed by the segment display. In the line thinning, the cluster of pixels of the character is thinned. Thereby, the width of the cluster of the pixels of the character can be uniform regardless of the boldness of the character of the segment display in the input image. Therefore, the character can be read with high accuracy regardless of the boldness of the character of the segment display.

In the first processing and the fourth processing, multiple determination regions are set in the character image. Then, the score is calculated based on the detection results of the number of pixels in the multiple determination regions. The score can be calculated regardless of the font of the character by using the detection results of the number of pixels.

Examples

An example of a method for calculating the first to seventh scores in the first to seventh processing will now be described.

In the first processing, the calculator 16 searches for a straight line along a prescribed direction in each of the determination regions. The initial value of the first score is 0. 5 is added to the first score when multiple straight lines are found in the determination region. 5 is added to the first score when multiple straight lines are scattered within a prescribed distance. 2 is added to the first score when an angle is greater than a preset threshold. 5 is added to the first score when a straight line is not found. The value of the total value divided by the pixels arranged in the prescribed direction multiplied by 5 is used as the score of the determination region. This processing is performed for each determination region. By using the sum total of the scores, the value obtained by (7−sum total)/7 is used as the first score.

In the second processing, the calculator 16 determines the calculated match ratio as the second score.

In the third processing, the calculator 16 calculates a ratio R1 of the length in the first direction D1 of the character image and the length in the second direction D2 of the character image. The calculator 16 refers to a preset ratio R2. The calculator 16 calculates V=R1/R2 when the ratio R2 is less than the ratio R1. The calculator 16 calculates V=R2/R1 when the ratio R1 is greater than the ratio R2.

The calculator 16 uses the value obtained by subtracting the absolute value of the value V from 1.0 as the third score.

In the fourth processing, the calculator 16 sets the fourth score to "1" if the combination of the determination results matches one of the registered patterns. The calculator 16 sets the fourth score to "0" if the combination of the determination results does not match one of the registered patterns.

In the fifth processing, the fifth score initially is set to 1.0. The calculator 16 generates a straight line based on a centroid position of multiple characters. The calculator 16 subtracts 0.4 points from the fifth score when the tilt of the straight line with respect to a prescribed direction is greater than a preset threshold. 0.2 points are subtracted from the fifth score when the distance between the straight line and the centroid position of the character is greater than a preset threshold. The distance between the straight line and the centroid position of the character is determined for each character.

In the sixth processing, the calculator 16 sets the sixth score to "1" when the number of characters is not less than the minimum character count and not more than the maximum character count. The calculator 16 sets the sixth score to "0" when the number of characters is less than the minimum character count or greater than the maximum character count.

In the seventh processing, the calculator 16 sets the seventh score to "1" if the recognition result of whether or not a decimal point exists based on the image matches the preregistered information. The calculator 16 sets the seventh score to "0" when the recognition result of the decimal point does not match the preregistered information.

The calculator 16 performs the following calculation.

$$S_0 = W_1 \times S_1 + W_2 \times S_2 + W_3 \times S_3 + W_4 \times S_4$$

$S_1$ is the first score. $W_1$ is the weight for the first score. $S_2$ is the second score. $W_2$ is the weight for the second score. $S_3$ is the third score. $W_3$ is the weight for the third score. $S_5$ is the fifth score. $W_5$ is the weight for the fifth score.

The calculator 16 extracts the lowest score from the calculated score $S_0$, the fourth score, the sixth score, and the seventh score and uses the lowest score as the certainty. Accordingly, the certainty is 0 when the fourth score, the sixth score, or the seventh score is 0.

Figure 13:
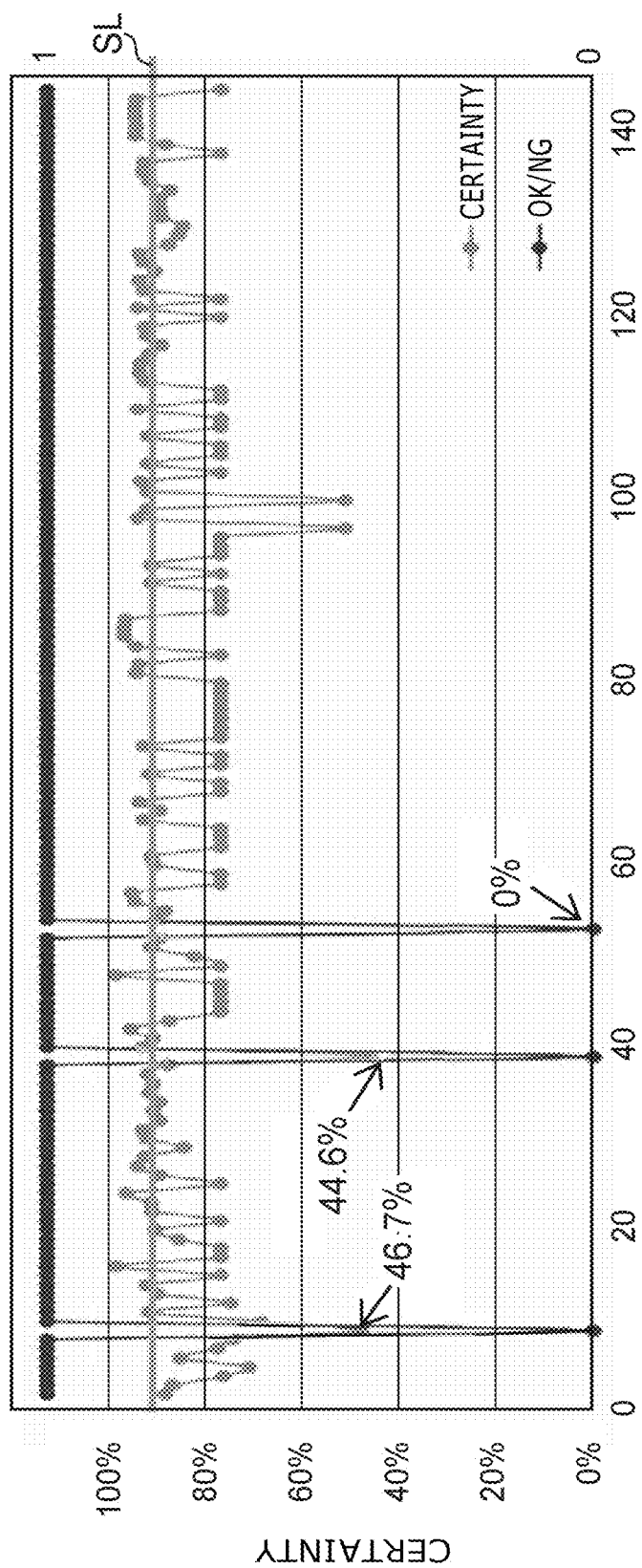
FIG. 13 is a graph illustrating the reading results and the certainties of an example.

FIG. 13 is a graph illustrating the reading results and the certainties of an example.

In FIG. 13, the plot of the dark color shows whether or not the reading result of the reading system 1 is correct. The value of the vertical axis is "1" when the reading result matches the numeral shown in the actual image. The plot of the light color illustrates the calculated certainty. A straight line SL illustrates the average value of the certainties. FIG. 13 illustrates the results when the reading is performed about 140 times.

In the example of FIG. 13, a mistaken numeral is read by the eighth, thirty-eighth, and fifty-second readings. For each of these readings, a certainty that was much less than the average value was calculated. For example, the user can see from the certainty that caution is necessary for the reading results for these readings. Also, because the certainty is high for the other reading results, it can be seen that the likelihood that the numeral actually is displayed is high even if an abnormal numeral is read.

The calculator 16 may compare the certainty to a first threshold. For example, when the certainty is less than the first threshold, the reading system 1 re-performs the image processing performed when reading the numeral by using a different condition. For example, there is a possibility that the numeral can be read accurately by using a different condition for the image cut-out, the correction of the distortion, the expansion processing, the contraction processing, etc.

The reading system 1 may output the numeral that is read when the certainty is greater than the first threshold and may output the numeral that is read, the certainty, and the character image when the certainty is not more than the first threshold. The reading system 1 also may output the certainty when the certainty is greater than the first threshold. According to this method, it is sufficient for the user to confirm the character image only when the certainty is low. The labor of the confirmation by the user can be reduced.

For example, the first threshold is preset by the user. Or, the first threshold may be calculated based on the calculation result of the certainty for a previous specified number of times or in a previous specified period.

In the example described above, the input image is processed by the reading system 1. The reading system 1 is not limited to the example; a processed image may be input to the reading system 1 according to the embodiment. For example, when the image is acquired by the imaging device, the character image may be extracted by another processing device. The other processing device transmits the extracted character image to the reading system 1. The reading system 1 may perform the reading of the numeral and the calculation of the certainty from the received character image.

In the example of the embodiments described above, a numeral that is displayed by a seven-segment display is read by the reading system 1. The reading system 1 also is applicable to the segment display other than a seven-segment display. For example, the character also can be read by a fourteen-segment display or a sixteen-segment display by using processing similar to the processing described above.

Figure 14A:
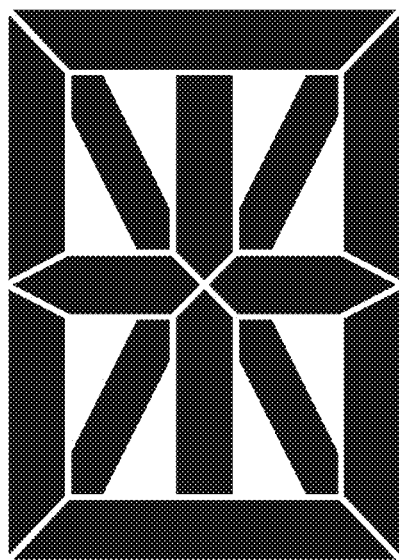
FIG. 14A to FIG. 14D are schematic views illustrating segment displays and settings of determination regions.
Figure 14B:
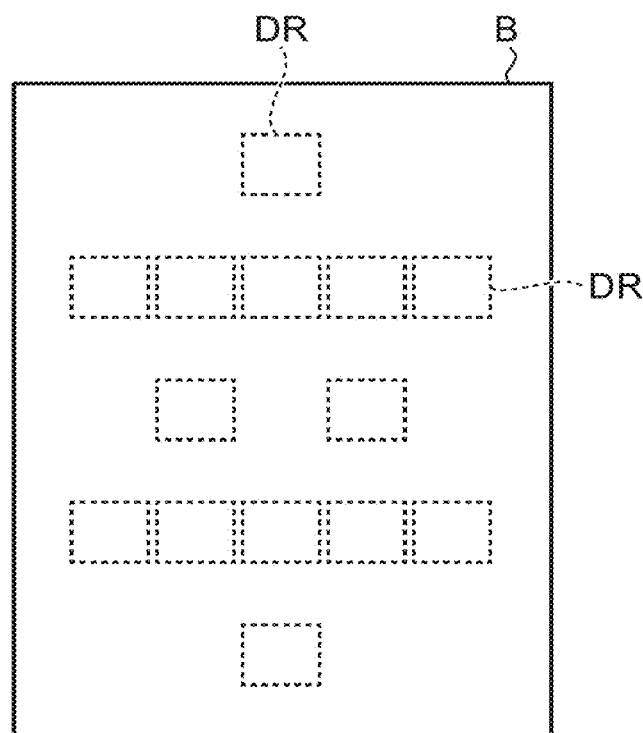
Figure 14C:
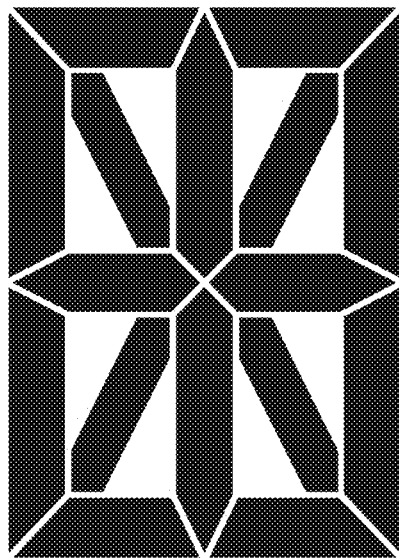
Figure 14D:
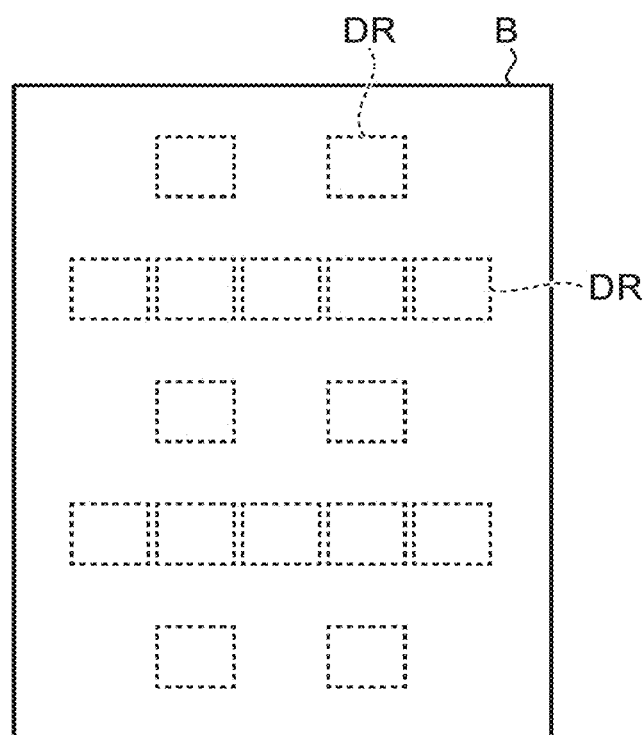

FIG. 14A and FIG. 14C are schematic views illustrating segment displays. FIG. 14B and FIG. 14D are schematic views illustrating settings of determination regions.

FIG. 14A illustrates an example of a fourteen-segment display. In the fourteen-segment display, one character is displayed by fourteen segments. In such a case, the calculator 16 sets fourteen or more determination regions in the character image. For example, as illustrated in FIG. 14B, the calculator 16 sets fourteen determination regions DR in the character image B. The calculator 16 performs the first processing and the fourth processing based on the determination regions DR that are set. Also, the calculator 16 performs the second processing by using a mask corresponding to the state in which all fourteen segments are lit.

FIG. 14C illustrates an example of a sixteen-segment display. In the sixteen-segment display, one character is displayed by sixteen segments. In such a case, the calculator 16 sets sixteen or more determination regions in the character image. For example, as illustrated in FIG. 14D, the calculator 16 sets sixteen determination regions DR in the character image B. The calculator 16 performs the first processing and the fourth processing based on the determination regions DR that are set. Also, the calculator 16 performs the second processing by using a mask corresponding to the state in which all sixteen segments are lit.

Figure 15:
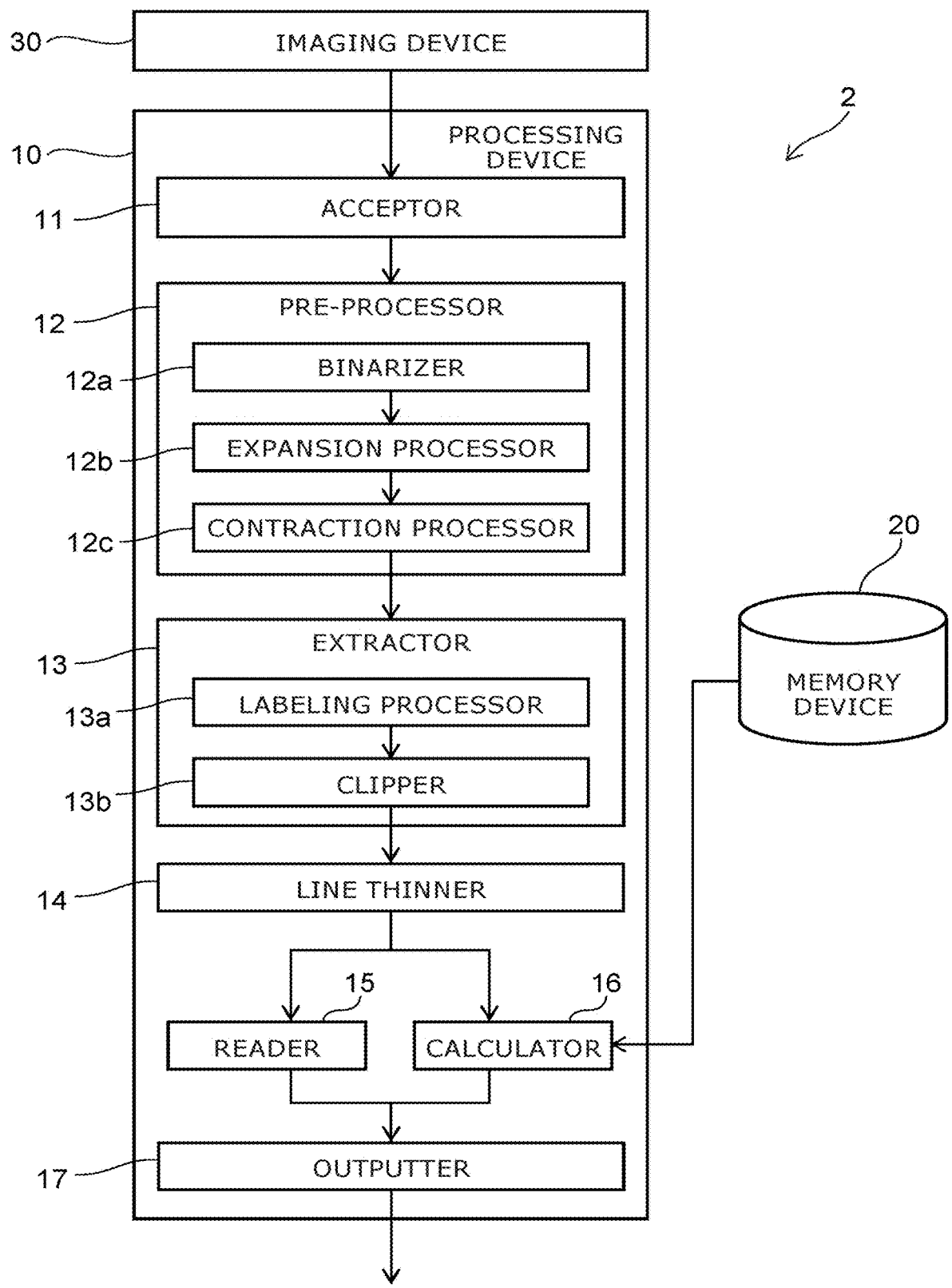
FIG. 15 is a block diagram illustrating a configuration of a reading system according to the embodiment.

FIG. 15 is a block diagram illustrating a configuration of a reading system according to the embodiment.

The reading system 1 according to the embodiment includes the processing device 10 and an imaging device 30. In the example of FIG. 15, the reading system 1 further includes the memory device 20 and an output device 40.

The imaging device 30 images the segment display and generates the image. The imaging device 30 transmits the generated image to the processing device 10. Or, the imaging device 30 may store the image in the memory device 20. The processing device 10 refers to the stored image by accessing the memory device 20. When the imaging device 30 acquires a video image, the imaging device 30 extracts a static image from the video image and transmits the static image to the processing device 10. The imaging device 30 includes, for example, a camera.

The processing device 10 transmits, to the output device 40, information based on the character that is read. The output device 40 outputs the information received from the processing device 10 so that the user can recognize the information. The output device 40 includes, for example, at least one of a monitor, a printer, a projector, or a speaker.

For example, the processing device 10, the memory device 20, the imaging device 30, and the output device 40 are connected to each other by a wired or wireless method. Or, these components may be connected to each other via a network. Or, at least two or more of the processing device 10, the memory device 20, the imaging device 30, or the output device 40 may be embedded in one device. For example, the processing device 10 may be embedded in an image processor of the imaging device 30, etc.

Figure 16:
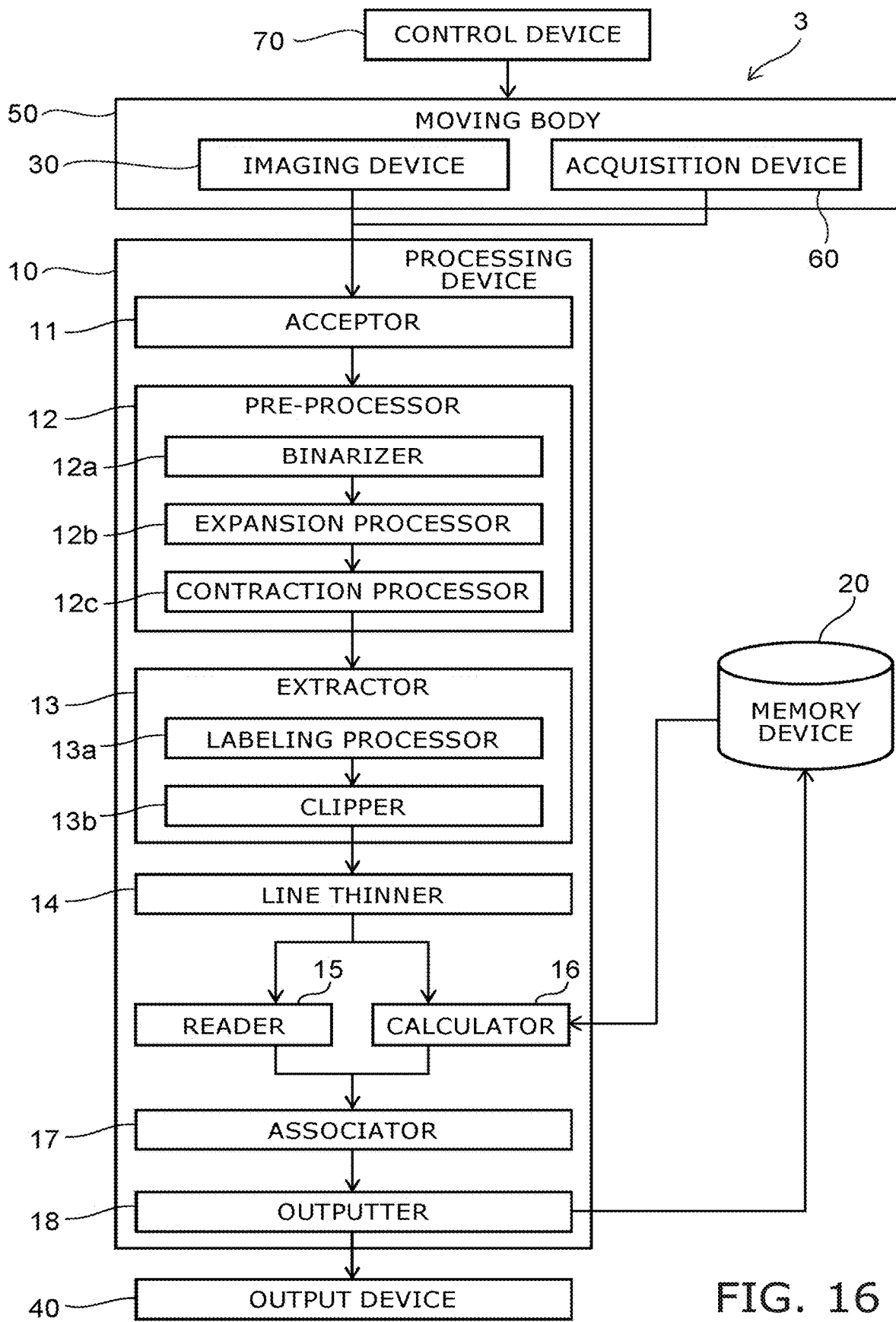
FIG. 16 is a block diagram illustrating a configuration of another reading system according to the embodiment.

FIG. 16 is a block diagram illustrating a configuration of another reading system according to the embodiment.

The reading system 2 illustrated in FIG. 16 further includes a moving body 50. The moving body 50 moves through a prescribed region. A segment display is provided in the region through which the moving body 50 moves. The moving body 50 is, for example, an automatic guided vehicle (AGV). The moving body 50 may be a flying object such as a drone, etc. The moving body 50 may be an independent walking robot. The moving body 50 may be an unmanned forklift, crane, or the like that performs a prescribed operation.

For example, the processing device 10 and the imaging device 30 are mounted to the moving body 50. The processing device 10 may be provided separately from the moving body 50 and may be connected to the moving body 50 via a network. When the moving body 50 moves to a position where a segment display is imageable, the imaging device 30 generates an image by imaging the segment display. Or, the imaging device 30 may image a video image while the moving body 50 moves. The imaging device 30 cuts out an image in which the segment display is imaged from the video image. The imaging device 30 transmits the acquired image to the processing device 10.

As illustrated in FIG. 16, the reading system 2 may further include an acquisition device 60. The acquisition device 60 is mounted to the moving body 50. For example, an identifier that includes unique identification information corresponding to the segment display is provided. The acquisition device 60 acquires the identification information of the identifier.

As illustrated in FIG. 16, the reading system 2 may further include a control device 70. The control device 70 controls the moving body 50. The moving body 50 moves through the prescribed region based on a command transmitted from the control device 70. The control device 70 may be mounted to the moving body 50 or may be provided separately from the moving body 50. The control device 70 includes, for example, a processing circuit made of a central processing unit. One processing circuit may function as both the processing device 10 and the control device 70.

For example, the identifier is a radio frequency (RF) tag including ID information. The identifier emits an electromagnetic field or a radio wave including the ID information.

The acquisition device 60 acquires the ID information by receiving the electromagnetic field or the radio wave emitted from the identifier.

Or, the identifier may be a one-dimensional or two-dimensional barcode. The acquisition device 60 may be a barcode reader. The acquisition device 60 acquires the identification information of the barcode by reading the barcode.

As illustrated in FIG. 16, the processing device 10 may further include an associator 18. For example, when acquiring the identification information, the acquisition device 60 transmits the identification information to the processing device 10. The associator 18 stores the transmitted identification information in the memory device 20 by associating the transmitted identification information with the character that is read.

Figure 17:
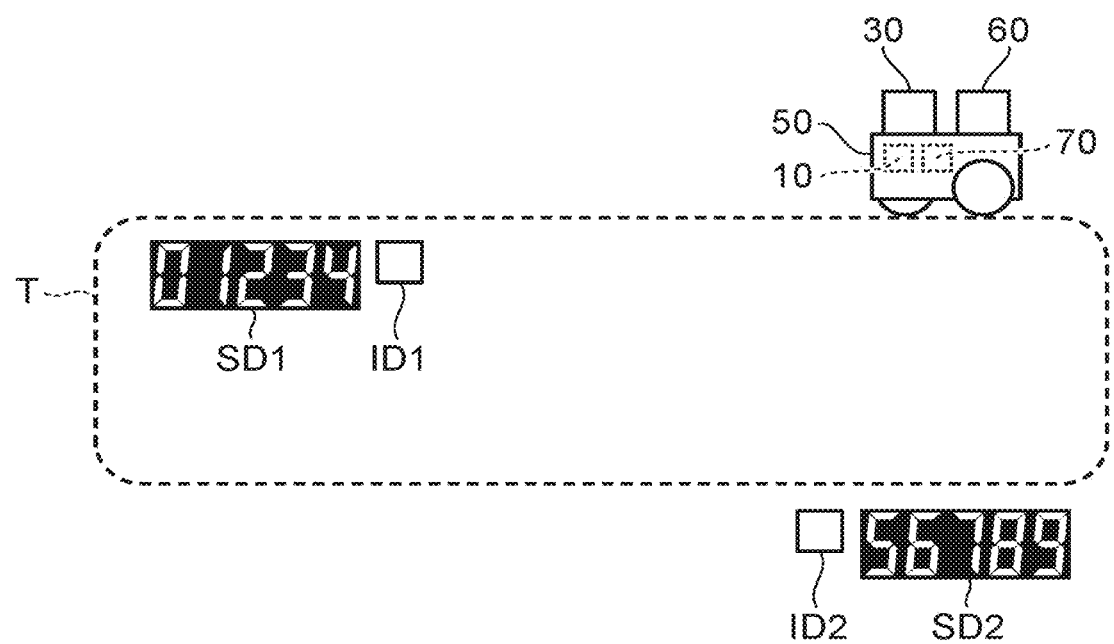
FIG. 17 is a schematic view describing an operation of another reading system according to the embodiment.

FIG. 17 is a schematic view describing an operation of another reading system according to the embodiment.

For example, the moving body 50 is a moving body moving along a prescribed trajectory T. The imaging device 30 and the acquisition device 60 are mounted to the moving body 50. The processing device 10 may be mounted to the moving body 50 or may be provided separately from the moving body 50. The trajectory T is provided so that the moving body 50 passes in front of segment displays SD1 and SD2.

For example, the moving body 50 moves along the trajectory T and decelerates or stops when arriving at a position where the segment display SD1 or SD2 is imageable by the imaging device 30. For example, when decelerating or stopping, the moving body 50 transmits an imaging command to the imaging device 30. Or, the imaging command may be transmitted to the imaging device 30 from the control device 70. When receiving the command, the imaging device 30 images the segment display SD1 or SD2 while the moving body 50 has decelerated or stopped.

Or, the moving body 50 moves along the trajectory T at a speed such that the imaging device 30 can image the segment display SD1 or SD2 without blur. When the position where the segment display SD1 or SD2 is imageable by the imaging device 30 is reached, the imaging command is transmitted from the moving body 50 or the control device recited above. When receiving the command, the imaging device 30 images the segment display SD1 or SD2. When the image has been generated by imaging, the imaging device 30 transmits the image to the processing device 10 mounted to the moving body 50 or provided separately from the moving body 50.

An identifier ID1 is provided at the segment display SD1 vicinity. An identifier ID2 is provided at the segment display SD2 vicinity. For example, the acquisition device 60 acquires the identification information of the identifier ID1 or ID2 while the moving body 50 has decelerated or stopped.

For example, the moving body 50 moves in front of the segment display SD1. The imaging device 30 generates an image by imaging the segment display SD1. The processing device 10 identifies the character displayed by the segment display SD1 from the image. Also, the acquisition device 60 acquires the identification information of the identifier ID1 corresponding to the segment display SD1. The processing device 10 associates the identification information and the identified character.

Or, when the moving body 50 moves in front of the segment display, initially, the acquisition device 60 may acquire the identification information of the identifier. For example, a command to read the characters of designated segment displays is transmitted to the moving body 50. The command includes information of the positions of the segment displays. The memory device 20 stores the associated each identification information and positions of the identifiers. The moving body 50 accesses the memory device 20 when the acquisition device 60 acquires identification information. The moving body 50 refers to the position of the identifier associated with the identification information. The moving body 50 determines whether or not the position of the referred identifier matches the position of the segment display that is commanded to be read. In the case of a match, the moving body 50 images the segment display SD1 by using the imaging device 30. In other words, in this method, the reading of the identification information functions as an interlock when reading the character of the segment display.

Figure 18:
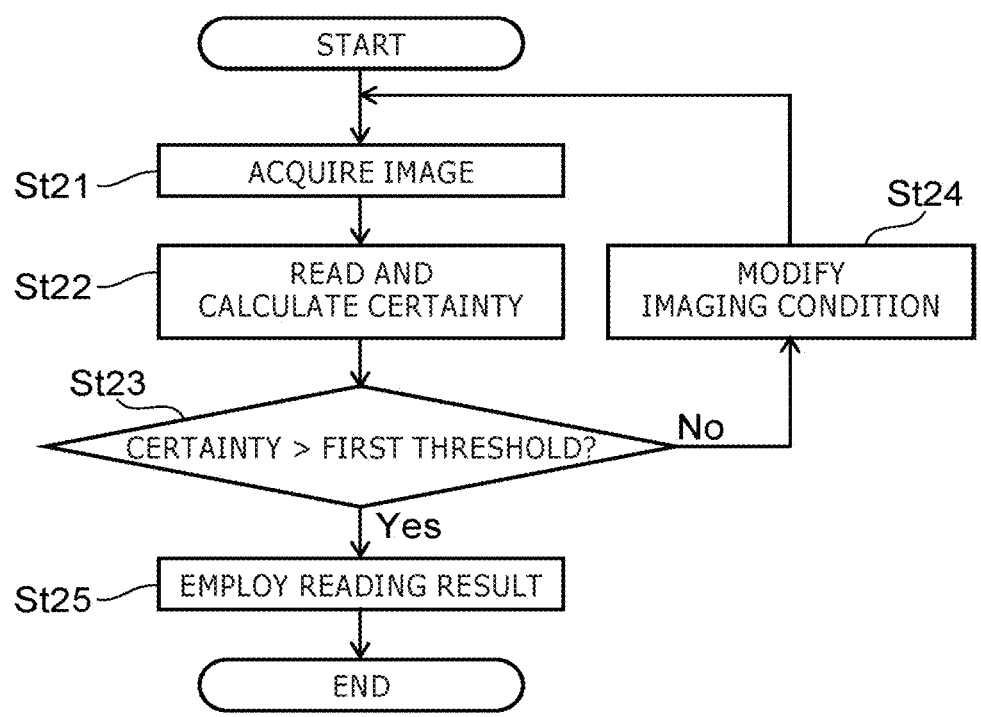
FIG. 18 is a flowchart illustrating processing according to the reading system according to the embodiment.
Figure 19:
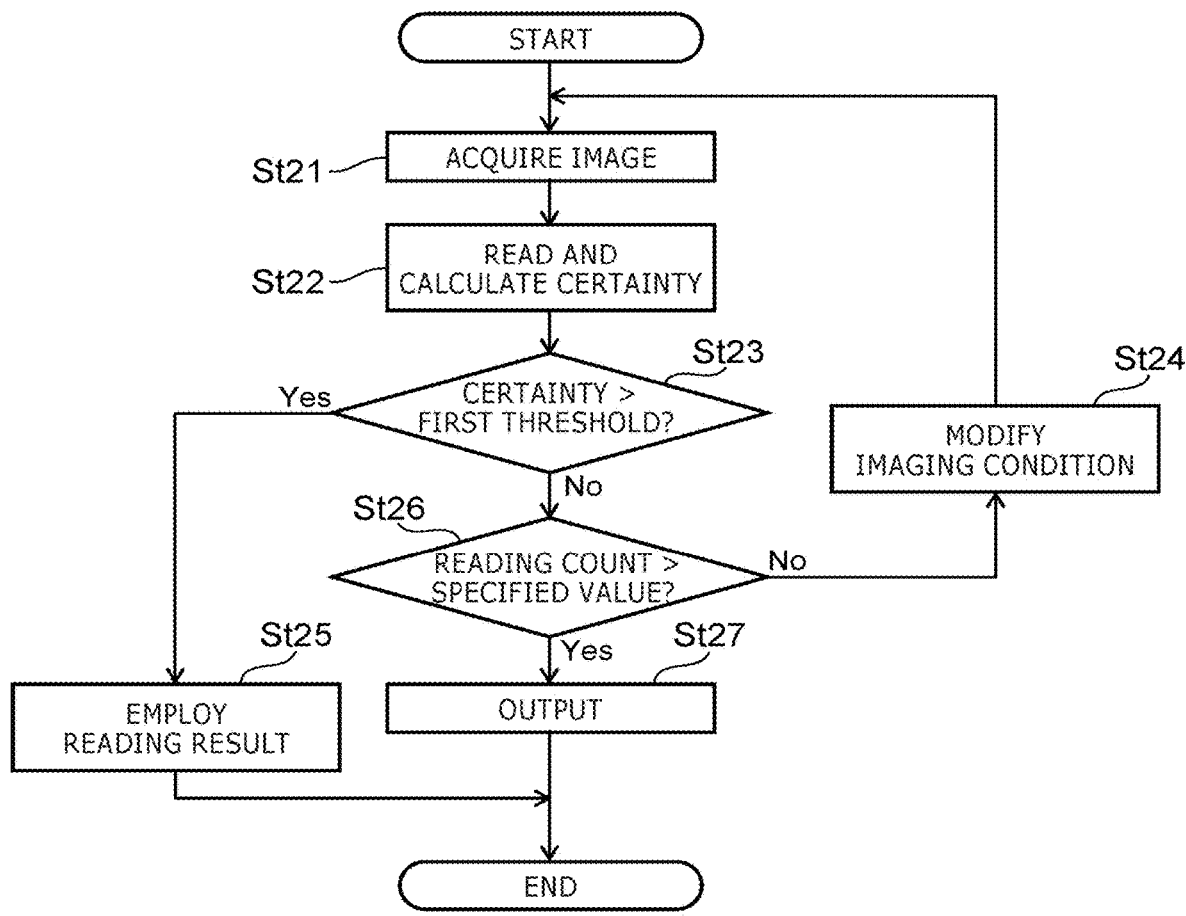
FIG. 19 is a flowchart illustrating processing according to the reading system according to the embodiment.

FIG. 18 and FIG. 19 are flowcharts illustrating processing according to the reading system according to the embodiment.

Examples of the processing according to the reading system according to the embodiment are described with reference to FIG. 18 and FIG. 19.

As illustrated in FIG. 18, the imaging device 30 acquires an image (a first image) by imaging a segment display (step St21). The imaging device 30 may image a video image and cut out, from the video image, an image in which a segment display is imaged. The image that is acquired by the processing device 10 is input. The processing device 10 reads the numeral of the segment display imaged in the image and calculates the certainty of the reading (step St22). The processing device 10 determines whether or not the certainty is greater than the first threshold (step St23). An imaging condition is modified when the certainty is not more than the first threshold (step St24). Subsequently, in step St21, another image (a second image) is acquired by reimaging the segment display using the modified imaging condition. The processing device 10 employs the reading result when the certainty is greater than the first threshold (step S25).

In step St24, for example, the imaging condition of at least one of the exposure time, the focal length, the aperture stop, or the sensitivity of the imaging device 30 is modified from the imaging condition from when the directly-previous step St21 was performed. Or, when the reading system includes the moving body 50, the moving body 50 may move in step St24. In other words, the position of the moving body 50 may be included as an imaging condition.

Or, when the certainty is not more than the first threshold, the imaging device 30 may reimage the segment display without modifying the imaging condition. In other words, step St24 may be omitted. Generally, the segment display is lit at a prescribed period. The numeral may be imaged unclearly due to the relationship between the lit period, the timing of the imaging, and the exposure time. There is a possibility that a clearer image may be obtained by reimaging the segment display by using the same imaging condition. Also, by not modifying the imaging condition, the likelihood of the reimaged image being too bright or too dark can be reduced.

Or, the imaging device 30 may modify the imaging condition according to the result of the processing of the first to seventh processing. For example, there is a possibility that the image is too bright or too dark when the first score or the fifth score is low. Therefore, when the first score or the fifth score is low, the imaging device 30 modifies at least one of the exposure time, the aperture stop, or the sensitivity. When the second score is low, there is a possibility that the image may be too bright. When the second score is low, the imaging device 30 performs at least one of a reduction of the exposure time, an increase of the aperture stop value, or a reduction of the sensitivity. For example, in the third processing, the calculator 16 calculates the proportion of the length of the character image in the first direction D1 to the length of the character image in the second direction D2. The calculator 16 also calculates the surface area of the character image. There is a possibility that the image may be too bright when the proportion is greater than a preset ratio (proportion) and the surface area is greater than a preset threshold. Therefore, the imaging device 30 performs at least one of a reduction of the exposure time, an increase of the aperture stop value, or a reduction of the sensitivity. There is a possibility that the image may be too dark when the proportion is less than the preset proportion and the surface area is less than the threshold. Therefore, the imaging device 30 performs at least one of an extension of the exposure time, a reduction of the aperture stop value, or an increase of the sensitivity. The likelihood of acquiring a more appropriate image can be increased by modifying the imaging condition according to the processing results of the first to seventh processing.

In the flowchart illustrated in FIG. 19, the processing device 10 determines whether or not the number of times that the reading has been performed up to that point is greater than a specified value (step St26) when the certainty is determined to be not more than the first threshold in step St23. In other words, the number of times that the reading has been performed is the number of times that step St22 has been performed. Step St24 is performed when the reading count is not more than the specified value. When the reading count is greater than the specified value, the reading system outputs the result without acquiring another image (step St27). For example, the processing device 10 outputs the numeral that is read, the certainty, and the image. Unnecessary repetition of the acquisition of the image can be prevented thereby.

According to the embodiments described above, the reliability of the reading system, the reading method, or the moving body can be increased. The reliability of the reading can be increased by using the program according to the embodiments for causing a computer (a processing device) to operate as the acceptor 11, the pre-processor 12, the extractor 13, the line thinner 14, the reader 15, the calculator 16, and the outputter 17.

For example, the processing of the various data recited above is executed based on a program (software). For example, the processing of the various information recited above is performed by a computer storing the program and reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

The processing device and the control device according to the embodiments include one or multiple devices (e.g., personal computers, etc.). The processing device and the control device according to the embodiments may include multiple devices connected by a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A reading system, comprising:
a reader configured to read a character from a character image, the character being displayed by a segment display and imaged in the character image, the segment display including a plurality of segments; and
a calculator configured to perform at least one selected from a group consisting of
first processing of setting a plurality of determination regions corresponding to the plurality of segments in the character image, and calculating a first score based on a state of pixels of the character in each of the plurality of determination regions,
a second processing of extracting, from the pixels of the character, pixels matching a mask, and calculating a second score based on a match ratio between the pixels of the character and the extracted pixels, the mask being preset,
third processing of calculating a third score based on a ratio of a length of the character image in a first direction and a length of the character image in a second direction, the second direction crossing the first direction, and
fourth processing of detecting an existence or absence of a portion of the character in each of the plurality of determination regions and calculating a fourth score based on a comparison result between the detected result and patterns, the patterns being preset,
wherein the calculator is further to calculate a certainty of the reading by using at least one selected from the group consisting of the first score, the second score, the third score, and the fourth score.

2. The system according to claim 1, wherein the calculator is further configured to:
perform at least one selected from a group consisting of the first processing and the second processing and at least one selected from a group consisting of the third processing and the fourth processing, and
calculate the certainty using at least one selected from a group consisting of the first score and the second score and at least one selected from a group consisting of the third score and the fourth score.

3. The system according to claim 1, wherein
the reader is further configured to read a plurality of the characters when the plurality of characters is displayed by the segment display,
the calculator is further configured to perform at least one selected from the group consisting of the first processing, the second processing, the third processing, and the fourth processing for each of a plurality of the character images in which the plurality of characters is imaged, and the calculator is further configured to calculate the certainty by using at least one selected from a group consisting of a plurality of the first scores, a plurality of the second scores, a plurality of the third scores, and a plurality of the fourth scores.

4. The system according to claim 3, wherein
the calculator is further configured to perform at least one selected from a group consisting of:
fifth processing of calculating a fifth score based on a fluctuation of positions of the plurality of characters and an arrangement direction of the plurality of characters;
sixth processing of calculating a sixth score based on a comparison result, the comparison result being between a maximum character count, a minimum character count, and a number of the plurality of characters, the minimum character count and the maximum character count being preset; and
seventh processing of calculating a seventh score based on a comparison result, the comparison result being between a recognition result of a decimal point for the plurality of characters and a preregistered existence or absence of the decimal point, and
the calculator is further configured to calculate the certainty by using at least one selected from the group consisting of the plurality of first scores, the plurality of second scores, the plurality of third scores, and the plurality of fourth scores and at least one selected from a group consisting of the fifth score, the sixth score, and the seventh score.

5. The system according to claim 1, wherein
the first processing includes determining, as the state for each of the plurality of determination regions, a number of lines included in the pixels after line thinning and an angle of the lines overlapping the determination region.

6. The system according to claim 1, wherein the mask used in the second processing corresponds to a state in which the plurality of segments is lit.

7. The system according to claim 1, further comprising:
an outputter configured to output the read character, the certainty, and the character image.

8. The system according to claim 1, further comprising:
an imaging device configured to acquire a first image including the character image by imaging the segment display; and
an extractor configured to extract the character image from the first image.

9. The system according to claim 8, wherein
the imaging device is further configured to image a video image and cut out, from the video image, the first image in which the segment display is imaged.

10. The system according to claim 8, wherein
when the certainty is not more than a first threshold, the imaging device is configured to acquire a second image by reimaging the segment display, and
the reader and the calculator are further configured to read a character and calculate a certainty of the reading for the second image.

11. The system according to claim 10, wherein
the imaging device is further configured to acquire the second image at a same imaging condition as when acquiring the first image.

12. The system according to claim 8, further comprising:
a moving body to which the imaging device is mounted.

13. A reading method, comprising:
reading a character from a character image, the character being displayed by a segment display and imaged in the character image, the segment display including a plurality of segments;
performing at least one selected from a group consisting of
first processing of setting a plurality of determination regions corresponding to the plurality of segments in the character image, and calculating a first score based on a state of pixels of the character in each of the plurality of determination regions,
second processing of extracting, from the pixels of the character, pixels matching a mask, and calculating a second score based on a match ratio between the pixels of the character and the extracted pixels, the mask being preset,
third processing of calculating a third score based on a ratio of a length of the character image in a first direction and a length of the character image in a second direction, the second direction crossing the first direction, and
fourth processing of detecting an existence or absence of a portion of the character in each of the plurality of determination regions and calculating a fourth score based on a comparison result between the detected result and patterns, the patterns being preset; and
calculating a certainty of the reading by using at least one selected from a group consisting of the first score, the second score, the third score, and the fourth score.

14. The method according to claim 13, further comprising:
performing at least one selected from a group consisting of
fifth processing of calculating a fifth score based on a fluctuation of positions of a plurality of the characters and an arrangement direction of the plurality of characters,
sixth processing of calculating a sixth score based on a comparison result, the comparison result being between a maximum character count, a minimum character count, and a number of the plurality of characters, the minimum character count and the maximum character count being preset, and
seventh processing of calculating a seventh score based on a comparison result, the comparison result being between a recognition result of a decimal point for the plurality of characters and a preregistered existence or absence of the decimal point; and
calculating the certainty by using at least one selected from a group consisting of a plurality of first scores, a plurality of second scores, a plurality of third scores, and a plurality of fourth scores and at least one selected from a group consisting of the fifth score, the sixth score, and the seventh score.

15. The method according to claim 13, further comprising:
imaging a video image and cutting out, from the video image, a first image in which the segment display is imaged, the first image including the character image, and
extracting the character image from the first image.

16. A non-transitory computer-readable storage medium storing a program, the program causing a processing device to:

read a character from a character image, the character being displayed by a segment display and imaged in the character image, the segment display including a plurality of segments;

perform at least one selected from a group consisting of
- first processing of setting a plurality of determination regions corresponding to the plurality of segments in the character image, and calculating a first score based on a state of pixels of the character in each of the plurality of determination regions,
- second processing of extracting, from the pixels of the character, pixels matching a mask, and calculating a second score based on a match ratio between the pixels of the character and the extracted pixels, the mask being preset,
- third processing of calculating a third score based on a ratio of a length of the character image in a first direction and a length of the character image in a second direction, the second direction crossing the first direction, and
- fourth processing of detecting an existence or absence of a portion of the character in each of the plurality of determination regions and calculating a fourth score based on a comparison result between the detected result and patterns, the patterns being preset; and calculate a certainty of the reading by using at least one selected from a group consisting of the first score, the second score, the third score, and the fourth score.

17. The non-transitory computer-readable storage medium according to claim 16, wherein the program further causes the processing device to:

perform at least one selected from a group consisting of
- fifth processing of calculating a fifth score based on a fluctuation of positions of a plurality of the characters and an arrangement direction of the plurality of characters,
- sixth processing of calculating a sixth score based on a comparison result, the comparison result being between a maximum character count, a minimum character count, and a number of the plurality of characters, the minimum character count and the maximum character count being preset, and
- seventh processing of calculating a seventh score based on a comparison result, the comparison result being between a recognition result of a decimal point for the plurality of characters and a preregistered existence or absence of the decimal point; and calculate the certainty by using at least one selected from a group consisting of a plurality of first scores, a plurality of second scores, a plurality of third scores, and a plurality of fourth scores and at least one selected from a group consisting of the fifth score, the sixth score, and the seventh score.

18. A moving body moving through a prescribed region, a segment display being provided in the prescribed region and including a plurality of segments, the moving body comprising:

an imaging device;

a reader configured to read, from an image of the segment display imaged by the imaging device, a character displayed by the segment display;

an extractor configured to cut out, from the image, a character image in which the character is imaged; and a calculator configured to perform at least one selected from a group consisting of
- first processing of setting a plurality of determination regions corresponding to the plurality of segments in the character image, and calculating a first score based on a state of pixels of the character in each of the plurality of determination regions,
- second processing of extracting, from the pixels of the character, pixels matching a mask, and calculating a second score based on a match ratio between the pixels of the character and the extracted pixels, the mask being preset,
- third processing of calculating a third score based on a ratio of a length of the character image in a first direction and a length of the character image in a second direction, the second direction crossing the first direction, and
- fourth processing of detecting an existence or absence of a portion of the character in each of the plurality of determination regions and calculating a fourth score based on a comparison result between the detected result and patterns, the patterns being preset, wherein the calculator is further configured to calculate a certainty of the reading by using at least one selected from a group consisting of the first score, the second score, the third score, and the fourth score.

19. The moving body according to claim 18, further comprising:

a control device configured to control the moving body and the imaging device, the control device being configured to cause the imaging device to image the segment display when the moving body moves to a position where the segment display is imageable by the imaging device.

20. The moving body according to claim 18, wherein the imaging device is configured to image a video image and cut out, from the video image, the image in which the segment display is imaged.

* * * * *